United States Patent
Wu et al.

(10) Patent No.: US 10,917,662 B2
(45) Date of Patent: Feb. 9, 2021

(54) METHOD AND APPARATUS FOR DEALING WITH COMPRESSED BITSTREAM INTERLEAVING

(71) Applicant: MEDIATEK INC., Hsin-Chu (TW)

(72) Inventors: Tung-Hsing Wu, Hsin-Chu (TW); Ting-An Lin, Hsin-Chu (TW); I-Hsuan Lee, Hsin-Chu (TW); Han-Liang Chou, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 56 days.

(21) Appl. No.: 16/280,039

(22) Filed: Feb. 20, 2019

(65) Prior Publication Data
US 2019/0281320 A1   Sep. 12, 2019

Related U.S. Application Data

(60) Provisional application No. 62/640,068, filed on Mar. 8, 2018.

(51) Int. Cl.
*H04N 19/60* (2014.01)
*H04N 19/88* (2014.01)
*H04N 19/119* (2014.01)
*H04N 19/184* (2014.01)
*H04N 19/176* (2014.01)

(52) U.S. Cl.
CPC ........... *H04N 19/60* (2014.11); *H04N 19/119* (2014.11); *H04N 19/176* (2014.11); *H04N 19/184* (2014.11); *H04N 19/88* (2014.11)

(58) Field of Classification Search
CPC .... H04N 19/61; H04N 19/176; H04N 19/119; H04N 19/184; H04N 19/60; H04N 19/88
See application file for complete search history.

(56) References Cited

U.S. PATENT DOCUMENTS

2017/0332103 A1* 11/2017 Moccagatta ........... H04N 19/61

FOREIGN PATENT DOCUMENTS

| CN | 102318342 A | 1/2012 |
|---|---|---|
| CN | 102783035 A | 11/2012 |
| CN | 104718754 A | 6/2015 |
| CN | 104754407 A | 7/2015 |

OTHER PUBLICATIONS

"International Search Report" dated Apr. 30, 2019 for International application No. PCT/CN2019/077131, International filing date:Mar. 6, 2019.

* cited by examiner

*Primary Examiner* — Obafemi O Sosanya
(74) *Attorney, Agent, or Firm* — Winston Hsu

(57) ABSTRACT

An encoding method is used for encoding an image. The image includes a plurality of blocks each having a plurality of pixels. The encoding method includes: encoding a plurality of data partitions of block data of a block in the image to generate a plurality of compressed bitstream segments, respectively; and combining the compressed bitstream segments to generate an output bitstream of the block. A bit group based interleaving process is involved in generating the output bitstream. According to the bit group based interleaving process, each of the compressed bitstream segments is divided into a plurality of bit groups each having at least one bit, and the output bitstream includes consecutive bit groups belonging to different compressed bitstream segments, respectively.

16 Claims, 23 Drawing Sheets

200

| $P_{11}$ | $P_{12}$ | $P_{13}$ | $P_{14}$ | $P_{15}$ | $P_{16}$ | $P_{17}$ | $P_{18}$ |
|---|---|---|---|---|---|---|---|
| $P_{21}$ | $P_{22}$ | $P_{23}$ | $P_{24}$ | $P_{25}$ | $P_{26}$ | $P_{27}$ | $P_{28}$ |

| $P_{11}$ | $P_{12}$ | $P_{13}$ | $P_{14}$ | $P_{15}$ | $P_{16}$ | $P_{17}$ | $P_{18}$ |
|---|---|---|---|---|---|---|---|
| $P_{21}$ | $P_{22}$ | $P_{23}$ | $P_{24}$ | $P_{25}$ | $P_{26}$ | $P_{27}$ | $P_{28}$ |

| $P_{11}$ | $P_{12}$ | $P_{13}$ | $P_{14}$ | $P_{15}$ | $P_{16}$ | $P_{17}$ | $P_{18}$ |
|---|---|---|---|---|---|---|---|
| $P_{21}$ | $P_{22}$ | $P_{23}$ | $P_{24}$ | $P_{25}$ | $P_{26}$ | $P_{27}$ | $P_{28}$ |

| $P_{11}$ | $P_{12}$ | $P_{13}$ | $P_{14}$ | $P_{15}$ | $P_{16}$ | $P_{17}$ | $P_{18}$ |
|---|---|---|---|---|---|---|---|
| $P_{21}$ | $P_{22}$ | $P_{23}$ | $P_{24}$ | $P_{25}$ | $P_{26}$ | $P_{27}$ | $P_{28}$ |

METHOD AND APPARATUS FOR DEALING WITH COMPRESSED BITSTREAM INTERLEAVING

CROSS REFERENCE TO RELATED APPLICATIONS

This application claims the benefit of U.S. provisional application No. 62/640,068, filed on Mar. 8, 2018 and incorporated herein by reference.

BACKGROUND

The disclosed embodiments of the present invention relate to image compression and decompression, and more particularly, to a method and apparatus for dealing with compressed bitstream interleaving.

The conventional video coding standards generally adopt a block based (or coding unit based) coding technique to exploit spatial redundancy. For example, the basic approach is to divide a source image into a plurality of blocks (coding units), and perform prediction on each block (coding unit) to generate residual. In one selected coding mode, the residual may be transformed, and the associated transform coefficients may be quantized and then entropy encoded into a compressed bitstream. In general, the video decoder performance is usually bounded by entropy decoding performance. Thus, there is a need for an innovative encoding scheme capable of generating an output bitstream that can facilitate parallel entropy decoding at a video decoder for increasing the decoding throughput.

SUMMARY

In accordance with exemplary embodiments of the present invention, a method and apparatus for dealing with compressed bitstream interleaving are proposed to solve the above-mentioned problem.

According to a first aspect of the present invention, an exemplary encoding method for encoding an image is disclosed. The image includes a plurality of blocks each having a plurality of pixels. The exemplary encoding method includes: encoding a plurality of data partitions of block data of a block in the image to generate a plurality of compressed bitstream segments, respectively; and combining, by a combining circuit, the compressed bitstream segments to generate an output bitstream of the block. A bit group based interleaving process is involved in generating the output bitstream. According to the bit group based interleaving process, each of the compressed bitstream segments is divided into a plurality of bit groups each having at least one bit, and the output bitstream comprises consecutive bit groups belonging to different compressed bitstream segments, respectively.

According to a second aspect of the present invention, an exemplary decoding method for decoding an input bitstream of a block in an image is disclosed. The image includes a plurality of blocks each having a plurality of pixels. The exemplary decoding method includes: deriving, by a splitting circuit, a plurality of compressed bitstream segments from the input bitstream, and decoding the compressed bitstream segments to obtain a plurality of data partitions of block data of the block, respectively. A bit group based de-interleaving process is involved in generating the compressed bitstream segments. According to the bit group based de-interleaving process, the input bitstream is divided into a plurality of bit groups each having at least one bit, and consecutive bit groups in the input bitstream are dispatched to different compressed bitstream segments, respectively.

According to a third aspect of the present invention, an exemplary decoding method for decoding an input bitstream of a block in an image is disclosed. The image includes a plurality of blocks each having a plurality of pixels. The exemplary decoding method includes: performing, by an un-folding circuit, an un-folding process, wherein according to the un-folding process, an un-folded bitstream segment is generated by duplicating bits of a folded and interleaved bitstream segment of the input bitstream and appending the duplicated bits of the folded and interleaved bitstream segment to the folded and interleaved bitstream segment in a reverse bit order; decoding first bits of the un-folded bitstream segment in a forward bit order to obtain a first data partition of block data of the block; and decoding second bits of the un-folded bitstream segment in a reverse bit order to obtain a second data partition of block data of the block.

According to a fourth aspect of the present invention, an exemplary encoding apparatus for encoding an image is disclosed. The image includes a plurality of blocks each having a plurality of pixels. The exemplary encoding apparatus includes an encoding circuit and a combining circuit. The encoding circuit is arranged to encode a plurality of data partitions of block data of a block in the image to generate a plurality of compressed bitstream segments, respectively. The combining circuit is arranged to combine the compressed bitstream segments to generate an output bitstream of the block, wherein a bit group based interleaving process performed by the combining circuit is involved in generating the output bitstream, and according to the bit group based interleaving process, each of the compressed bitstream segments is divided into a plurality of bit groups each having at least one bit, and the output bitstream comprises consecutive bit groups belonging to different compressed bitstream segments, respectively.

According to a fifth aspect of the present invention, an exemplary decoding apparatus for decoding an input bitstream of a block in an image is disclosed. The image includes a plurality of blocks each having a plurality of pixels. The exemplary decoding apparatus includes a splitting circuit and a decoding circuit. The splitting circuit is arranged to derive a plurality of compressed bitstream segments from the input bitstream, wherein a bit group based de-interleaving process performed by the splitting circuit is involved in generating the compressed bitstream segments, and according to the bit group based de-interleaving process, the input bitstream is divided into a plurality of bit groups each having at least one bit, and consecutive bit groups in the input bitstream are dispatched to different compressed bitstream segments, respectively. The decoding circuit is arranged to decode the compressed bitstream segments to obtain a plurality of data partitions of block data of the block, respectively.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a first block data partitioning design according to an embodiment of the present invention.

FIG. 3 is a diagram illustrating a second block data partitioning design according to an embodiment of the present invention.

FIG. 4 is a diagram illustrating a third block data partitioning design according to an embodiment of the present invention.

FIG. 5 is a diagram illustrating a fourth block data partitioning design according to an embodiment of the present invention.

FIG. 6 is a diagram illustrating a fifth block data partitioning design according to an embodiment of the present invention.

FIG. 7 is a diagram illustrating a sixth block data partitioning design according to an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
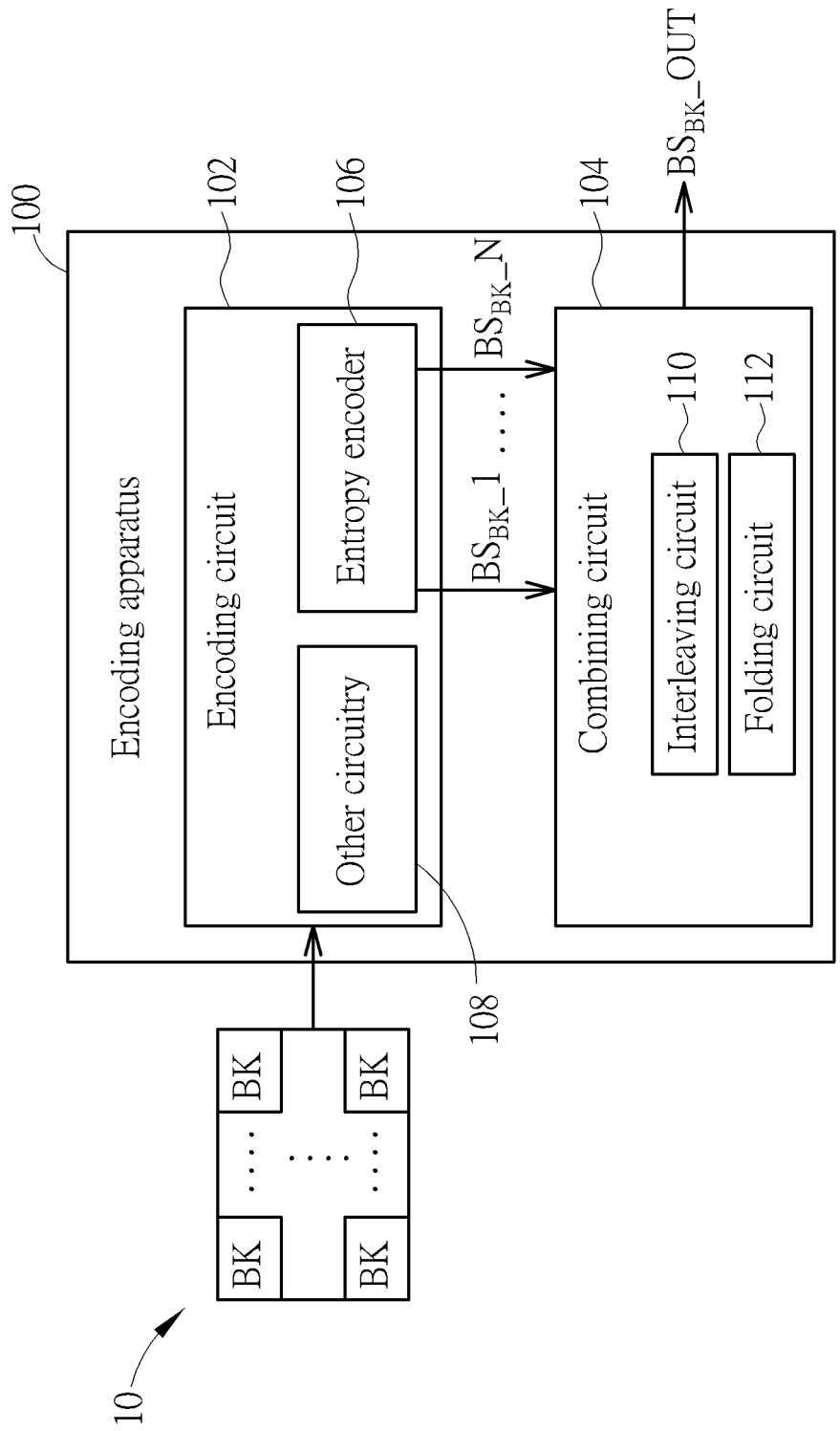
FIG. 1 is a diagram illustrating an encoding apparatus according to an embodiment of the present invention.

FIG. 1 is a diagram illustrating an encoding apparatus according to an embodiment of the present invention. The encoding apparatus 100 may be a part of a video encoder. The encoding apparatus 100 is arranged to encode an image 10 (e.g., one frame of an input video sequence), and includes an encoding circuit 102 and a combining circuit 104. The image 10 includes a plurality of blocks BK each having a plurality of pixels. Regarding each block BK of the image 10, the encoding circuit 102 is arranged to encode a plurality of data partitions of block data of the block to generate a plurality of compressed bitstream segments $BS_{BK}\_1$-$BS_{BK}\_N$ (N>1), respectively. The encoding circuit 102 includes an entropy encoder 106, and further include other circuitry 108 needed to achieve the designated encoding function. For example, other circuitry 108 may include a motion estimation circuit, a motion compensation circuit, a residual calculation circuit, a transform circuit, a quantization circuit, an inverse quantization circuit, an inverse transform circuit, a reconstruct circuit, at least one in-loop filter, etc. The entropy encoder 106 is responsible for encoding symbols provided by other circuitry 108, where the term "symbol" may mean any data to be entropy encoded by the entropy encoder 106. For example, a symbol may be a quantized transform coefficient. Hence, symbols derived from one of the data partitions associated with the same block BK is entropy encoded into one of the compressed bitstream segments $BS_{BK}\_1$-$BS_{BK}\_N$. By way of example, but not limitation, entropy encoding of symbols derived from one of the data partitions may be independent of entropy encoding of symbols derived from another of the data partitions.

In one exemplary design, the data partitions are decided on the basis of pixels. FIG. 2 is a diagram illustrating a first block data partitioning design according to an embodiment of the present invention. Each block BK of the image 10 may be an m×n block that has m pixels in a width direction and n pixels in a height direction, where m≥1 and/or n≥1. For example, a block 200 shown in FIG. 2 is an 8×2 block having pixels $P_{11}$-$P_{18}$ and $P_{21}$-$P_{28}$, where m=8 and n=2. The block 200 may be encoded by the encoding circuit 102 to generate two compressed bitstream segments $BS_{BK}\_1$ and $BS_{BK\_}N$ (N=2). The compressed bitstream segment $BS_{BK\_}1$ may be generated from encoding of one data partition consisting of complete pixel data of pixels $P_{11}$, $P_{13}$, $P_{15}$, $P_{17}$, $P_{22}$, $P_{24}$, $P_{26}$ and $P_{28}$. The compressed bitstream segment $BS_{BK\_}N$ (N=2) may be generated from encoding of another data partition consisting of complete pixel data of pixels $P_{12}$, $P_{14}$, $P_{16}$, $P_{18}$, $P_{21}$, $P_{23}$, $P_{25}$, and $P_{27}$.

FIG. 3 is a diagram illustrating a second block data partitioning design according to an embodiment of the present invention. A block 300 shown in FIG. 3 is an 8×2 block having pixels $P_{11}$-$P_{18}$ and $P_{21}$-$P_{28}$. The block 300 may be encoded by the encoding circuit 102 to generate two compressed bitstream segments $BS_{BK\_}1$ and $BS_{BK\_}N$ (N=2). The compressed bitstream segment $BS_{BK\_}1$ may be generated from encoding of one data partition consisting of complete pixel data of pixels $P_{11}$, $P_{13}$, $P_{16}$, $P_{18}$, $P_{22}$, $P_{24}$, $P_{25}$, and $P_{27}$. The compressed bitstream segment $BS_{BK\_}N$ (N=2) may be generated from encoding of another data partition consisting of complete pixel data of pixels $P_{12}$. $P_{14}$, $P_{15}$, $P_{17}$, $P_{21}$, $P_{23}$, $P_{26}$, and $P_{28}$.

FIG. 4 is a diagram illustrating a third block data partitioning design according to an embodiment of the present invention. A block 400 shown in FIG. 4 is an 8×2 block having pixels $P_{11}$-$P_{18}$ and $P_{21}$-$P_{28}$. The block 400 may be encoded by the encoding circuit 102 to generate two compressed bitstream segments $BS_{BK\_}1$ and $BS_{BK\_}2$, where N=2. The compressed bitstream segment $BS_{BK\_}1$ may be generated from encoding of one data partition consisting of complete pixel data of pixels $P_{13}$, $P_{14}$, $P_{17}$, $P_{18}$, $P_{21}$, $P_{22}$, $P_{25}$, and $P_{26}$. The compressed bitstream segment $BS_{BK\_}2$ may be generated from encoding of another data partition consisting of complete pixel data of pixels $P_{11}$, $P_{12}$, $P_{15}$, $P_{16}$, $P_{23}$, $P_{24}$, $P_{27}$, and $P_{28}$.

FIG. 5 is a diagram illustrating a fourth block data partitioning design according to an embodiment of the present invention. A block 500 shown in FIG. 5 is an 8×2 block having pixels $P_{11}$-$P_{18}$ and $P_{21}$-$P_{28}$. The block 500 may be encoded by the encoding circuit 102 to generate two compressed bitstream segments $BS_{BK\_}1$ and $BS_{BK\_}N$ (N=2). The compressed bitstream segment $BS_{BK\_}1$ may be generated from encoding of one data partition consisting of complete pixel data of pixels $P_{11}$-$P_{18}$. The compressed bitstream segment $BS_{BK\_}N$ (N=2) may be generated from encoding of another data partition consisting of complete pixel data of pixels $P_{21}$-$P_{26}$.

Figures 6, 7:
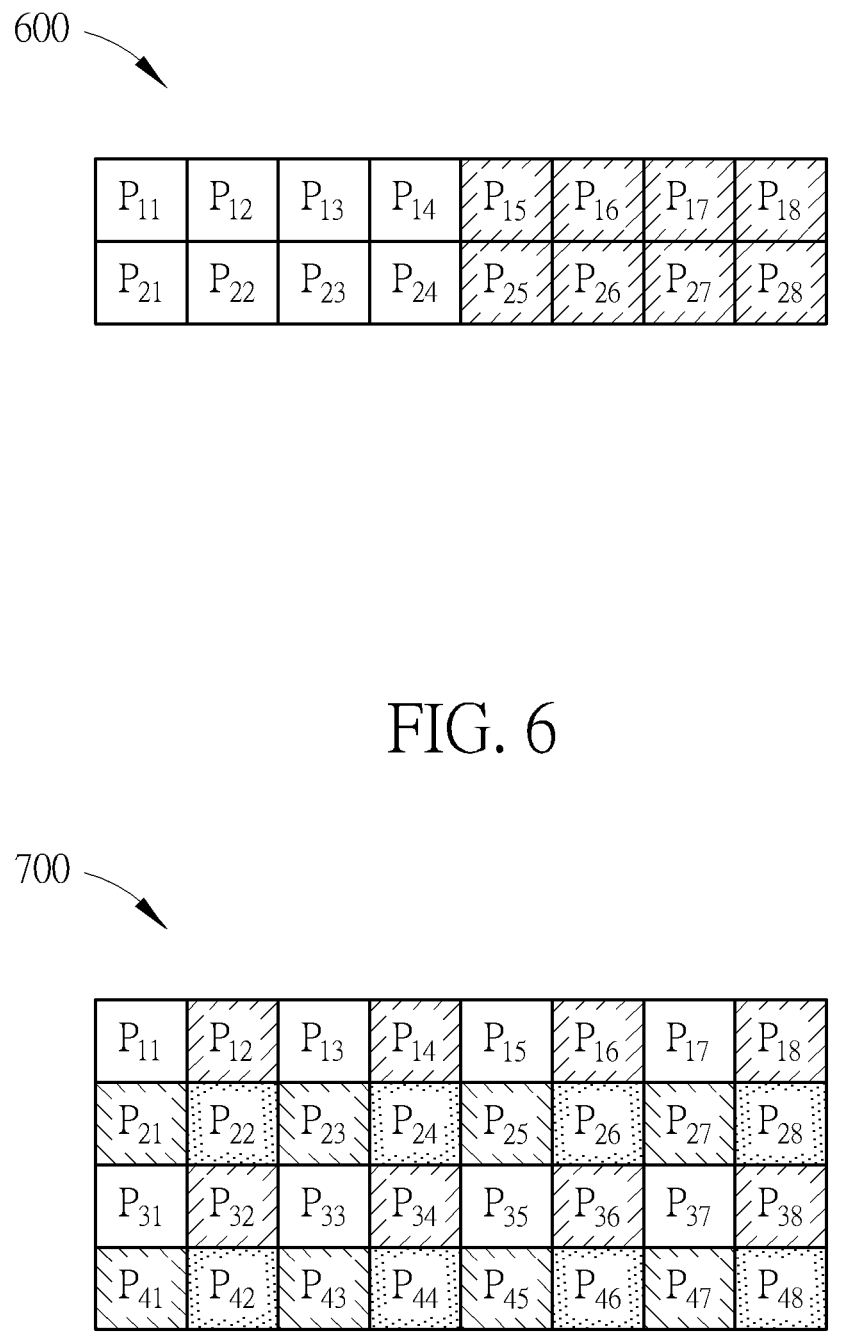

FIG. 6 is a diagram illustrating a fifth block data partitioning design according to an embodiment of the present invention. A block 600 shown in FIG. 6 is an 8×2 block having pixels $P_{11}$-$P_{18}$ and $P_{21}$-$P_{28}$.

The block 600 may be encoded by the encoding circuit 102 to generate two compressed bitstream segments $BS_{BK\_}1$ and $BS_{BK\_}N$ (N=2). The compressed bitstream segment $BS_{BK\_}1$ may be generated from encoding of one data partition consisting of complete pixel data of pixels $P_{11}$-$P_{14}$ and $P_{21}$-$P_{24}$. The compressed bitstream segment $BS_{BK\_}N$ (N=2) may be generated from encoding of another data partition consisting of complete pixel data of pixels $P_{15}$-$P_{18}$ and $P_{25}$-$P_{28}$.

FIG. 7 is a diagram illustrating a sixth block data partitioning design according to an embodiment of the present invention. A block 700 shown in FIG. 7 is an 8×4 block having pixels $P_{11}$-$P_{18}$, $P_{21}$-$P_{28}$, $P_{31}$-$P_{38}$, and $P_{41}$-$P_{48}$. The block 700 may be encoded by the encoding circuit 102 to generate four compressed bitstream segments $BS_{BK\_}1$, $BS_{BK\_}2$, $BS_{BK\_}3$, and $BS_{BK\_}N$ (N=4). The compressed bitstream segment $BS_{BK\_}1$ may be generated from encoding of a first data partition consisting of complete pixel data of pixels $P_{11}$, $P_{13}$, $P_{15}$, $P_{17}$, $P_{31}$, $P_{33}$, $P_{35}$, and $P_{36}$. The compressed bitstream segment $BS_{BK\_}2$ may be generated from encoding of a second data partition consisting of complete pixel data of pixels $P_{12}$, $P_{14}$, $P_{16}$, $P_{18}$, $P_{32}$, $P_{34}$, $P_{36}$, and $P_{38}$. The compressed bitstream segment $BS_{BK\_}3$ may be generated from encoding of a third data partition consisting of complete pixel data of pixels $P_{21}$, $P_{23}$, $P_{25}$, $P_{27}$, $P_{41}$, $P_{43}$, $P_{45}$, and $P_{46}$. The compressed bitstream segment $BS_{BK\_}N$ (N=4) may be generated from encoding of a fourth data partition consisting of complete pixel data of pixels $P_{22}$, $P_{24}$, $P_{26}$, $P_{28}$, $P_{42}$, $P_{44}$, $P_{46}$, and $P_{48}$.

Figure 8:
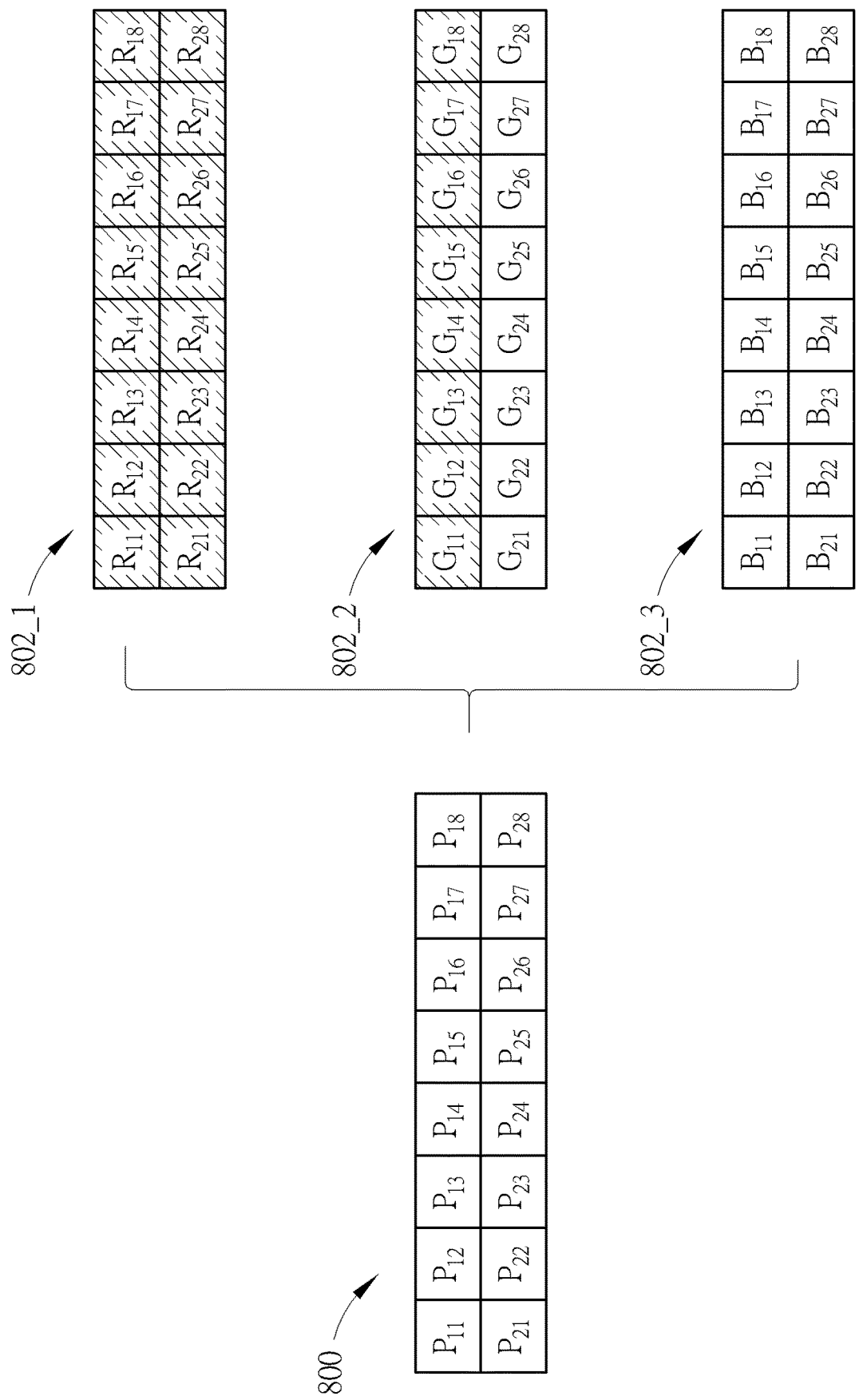
FIG. 8 is a diagram illustrating a seventh block data partitioning design according to an embodiment of the present invention.

In another exemplary design, the data partitions are decided on the basis of sub-pixels (color channels). FIG. 8 is a diagram illustrating a seventh block data partitioning design according to an embodiment of the present invention. Each block BK of the image 10 may be an m×n block that has m pixels in a width direction and n pixels in a height direction, where m≥1 and/or n≥1. For example, a block 800 shown in FIG. 8 is an 8×2 block having pixels $P_{11}$-$P_{18}$ and $P_{21}$-$P_{28}$, where m=8 and n=2. Each pixel is composed of a plurality of sub-pixels corresponding to different color channels, respectively. In this embodiment, each pixel includes a sub-pixel corresponding to a red (R) color channel, a sub-pixel corresponding to a green (G) color channel, and a sub-pixel corresponding to a blue (B) color channel. As shown in FIG. 8, the pixel $P_{11}$ is composed of sub-pixels $\{R_{11}, G_{11}, B_{11}\}$, the pixel $P_{12}$ is composed of sub-pixels $\{R_{12}, G_{12}, B_{12}\}$, and so on. Hence, the block 800 may be regarded as having an R color channel block 802_1, a G color channel block 802_2, and a B color channel block 802_3, where the R color channel block 802_1 includes sub-pixels $R_{11}$-$R_{18}$ and $R_{21}$-$R_{28}$, the G color channel block 802_2 includes sub-pixels $G_{11}$-$G_{18}$ and $G_{21}$-$G_{28}$, and the B color channel block 802_3 includes sub-pixels $B_{11}$-$B_{18}$ and $B_{21}$-$B_{28}$. The block 800 may be encoded by the encoding circuit 102 to generate two compressed bitstream segments $BS_{BK\_}1$ and $BS_{BK\_}N$ (N=2). The compressed bitstream segment $BS_{BK\_}1$ may be generated from encoding of one data partition consisting of sub-pixel data of sub-pixels $G_{21}$-$G_{28}$, $B_{11}$-$B_{18}$, and $B_{21}$-$B_{28}$. The compressed bitstream segment $BS_{BK\_}N$ (N=2) may be generated from encoding of another data partition consisting of sub-pixel data of sub-pixels $R_{11}$-$R_{18}$, $R_{21}$-$R_{28}$, and $G_{11}$-$G_{18}$.

Figure 9:
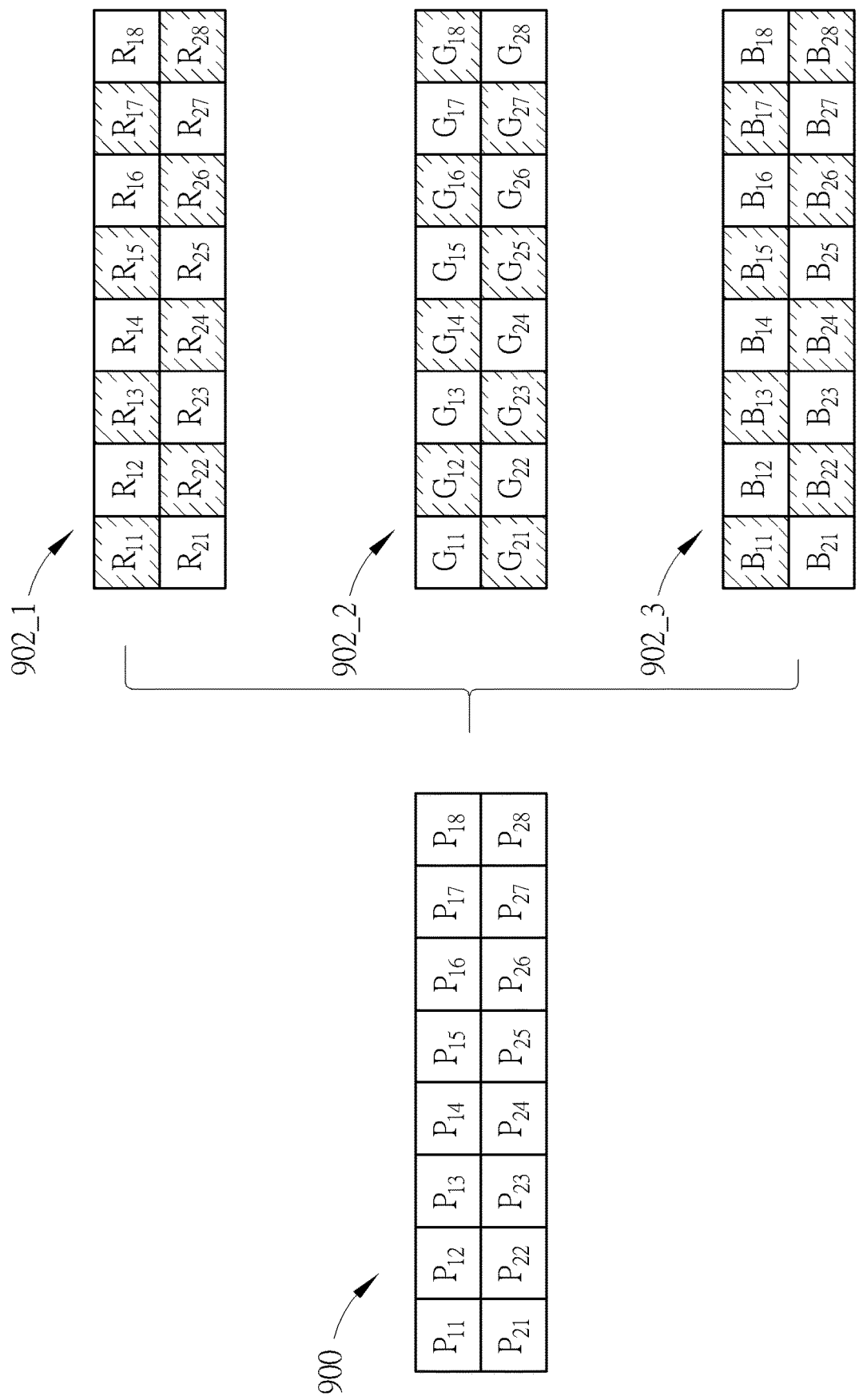
FIG. 9 is a diagram illustrating an eighth block data partitioning design according to an embodiment of the present invention.

FIG. 9 is a diagram illustrating an eighth block data partitioning design according to an embodiment of the present invention. A block 900 shown in FIG. 9 is an 8×2 block having pixels $P_{11}$-$P_{18}$ and $P_{21}$-$P_{28}$, where each pixel is composed of a plurality of sub-pixels corresponding to different color channels, respectively. In this embodiment, each pixel includes a sub-pixel corresponding to an R color channel, a sub-pixel corresponding to a G color channel, and a sub-pixel corresponding to a B color channel. Hence, the block 900 may be regarded as having an R color channel block 902_1, a G color channel block 902_2, and a B color channel block 902_3, where the R color channel block 902_1 includes sub-pixels $R_{11}$-$R_{18}$ and $R_{21}$-$R_{28}$, the G color channel block 902_2 includes sub-pixels $G_{11}$-$G_{18}$ and $G_{21}$-$G_{28}$, and the B color channel block 902_3 includes sub-pixels $B_{11}$-$B_{18}$ and $B_{21}$-$B_{28}$. The block 900 may be encoded by the encoding circuit 102 to generate two compressed bitstream segments $BS_{BK\_}1$ and $BS_{BK\_}N$ (N=2). The compressed bitstream segment $BS_{BK\_}1$ may be generated from encoding of one data partition consisting of sub-pixel data of sub-pixels $R_{12}$, $R_{14}$, $R_{16}$, $R_{18}$, $R_{21}$, $R_{23}$, $R_{25}$, $R_{27}$, $G_{11}$, $G_{13}$, $G_{15}$, $G_{17}$, $G_{22}$, $G_{24}$, $G_{26}$, $G_{28}$, $B_{12}$, $B_{14}$, $B_{15}$, $B_{18}$, $B_{21}$, $B_{23}$, $B_{25}$, and $B_{27}$. The compressed bitstream segment $BS_{BK\_}N$ (N=2) may be generated from encoding of another data partition consisting of sub-pixel data of sub-pixels $R_{11}$, $R_{13}$, $R_{15}$, $R_{17}$, $R_{22}$, $R_{24}$, $R_{26}$, $R_{28}$, $G_{12}$, $G_{14}$, $G_{16}$, $G_{18}$, $G_{21}$, $G_{23}$, $G_{25}$, $G_{27}$, $B_{11}$, $B_{13}$, $B_{15}$, $B_{17}$, $B_{22}$, $B_{24}$, $B_{25}$, and $B_{28}$.

Figure 10:
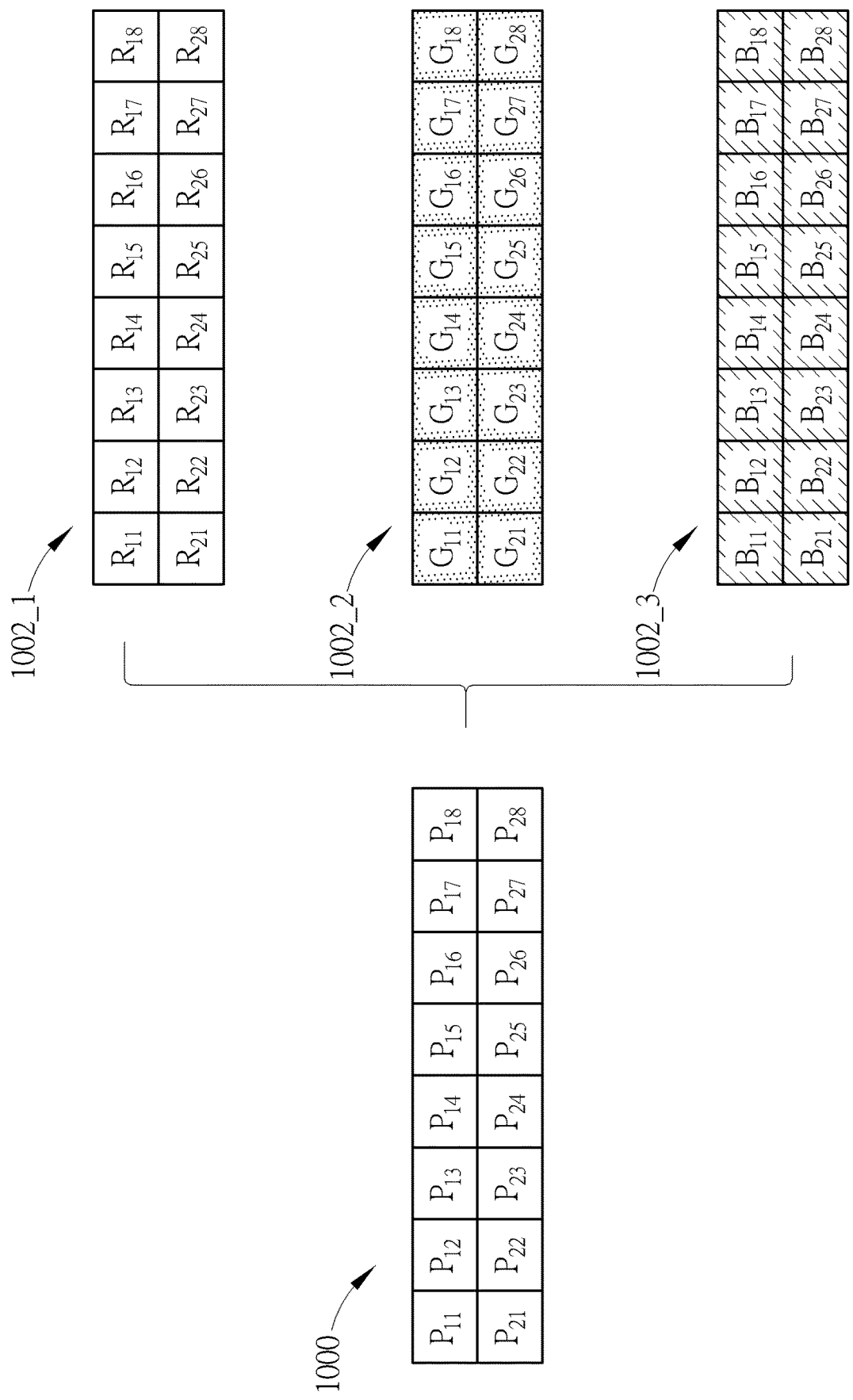
FIG. 10 is a diagram illustrating a ninth block data partitioning design according to an embodiment of the present invention.

FIG. 10 is a diagram illustrating a ninth block data partitioning design according to an embodiment of the present invention. A block 1000 shown in FIG. 10 is an 8×2 block having pixels $P_{11}$-$P_{18}$ and $P_{21}$-$P_{28}$, where each pixel is composed of a plurality of sub-pixels corresponding to different color channels, respectively. In this embodiment, each pixel includes a sub-pixel corresponding to an R color channel, a sub-pixel corresponding to a G color channel, and a sub-pixel corresponding to a B color channel. Hence, the block 1000 may be regarded as having an R color channel block 1002_1, a G color channel block 1002_2, and a B color channel block 1002_3, where the R color channel block 1002_1 includes sub-pixels $R_{11}$-$R_{18}$ and $R_{21}$-$R_{28}$, the G color channel block 1002_2 includes sub-pixels $G_{11}$-$G_{18}$ and $G_{21}$-$G_{28}$, and the B color channel block 1002_3 includes sub-pixels $B_{11}$-$B_{18}$ and $B_{21}$-$B_{28}$. The block 1000 may be encoded by the encoding circuit 102 to generate three compressed bitstream segments $BS_{BK\_}1$, $BS_{BK\_}2$, and $BS_{BK\_}N$ (N=3). The compressed bitstream segment $BS_{BK\_}1$ may be generated from encoding of a first data partition consisting of sub-pixel data of sub-pixels $R_{11}$-$R_{18}$ and $R_{21}$-$R_{28}$. The compressed bitstream segment $BS_{BK\_}2$ may be generated from encoding of a second data partition consisting of sub-pixel data of sub-pixels $G_{11}$-$G_{18}$ and $G_{21}$-$G_{28}$. The compressed bitstream segment $BS_{BK\_}N$ (N=3) may be generated from encoding of a third data partition consisting of sub-pixel data of sub-pixels $B_{11}$-$B_{18}$ and $B_{21}$-$B_{28}$.

It should be noted that the block data partitioning designs illustrated in FIGS. 2-10 are for illustrative purposes only, and are not meant to be limitations of the present invention. In practice, block data of one block can be partitioned according to the actual design considerations. For example, with the use of a properly selected block data partitioning design, bitstream lengths of compressed bitstream segments $BS_{BK\_}1$-$BS_{BK\_}N$ may be approximately the same, thus relaxing the compressed bitstream interleaving burden of the combining circuit 104. For example, when the compressed bitstream segments $BS_{BK\_}1$-$BS_{BK\_}N$ have the same bitstream length, no dummy bit insertion is required.

As mentioned above, the encoding circuit 102 generates more than one compressed bitstream segment when encoding one block BK of the image 10. The encoding apparatus 100 further includes the combining circuit 104 arranged to combine the compressed bitstream segments $BS_{BK\_}1$-$BS_{BK\_}N$ to generate an output bitstream $BS_{BK\_}OUT$ of the block BK. In this embodiment, the combining circuit 104 includes an interleaving circuit 110 and a folding circuit 112, where the interleaving circuit 110 is arranged to perform a bit group based interleaving process, and the folding circuit 112 is arranged to perform a bit group based folding process. The entropy encoder 106 may be configured to entropy encode symbols (e.g., quantized transform coefficients) of different data partitions independently. To achieve parallel entropy decoding at a video decoder, bits of the compressed bitstream segments $BS_{BK\_}1$-$BS_{BK\_}N$ can be properly interleaved for creating the output bitstream $BS_{BK\_}OUT$. Moreover, compressed bitstream folding can be enabled to reduce the interleaving overhead resulting from dummy bit insertion. Further details of the proposed bit group based interleaving process and the proposed bit group based folding process are described with reference to the accompanying drawings.

Figure 11:
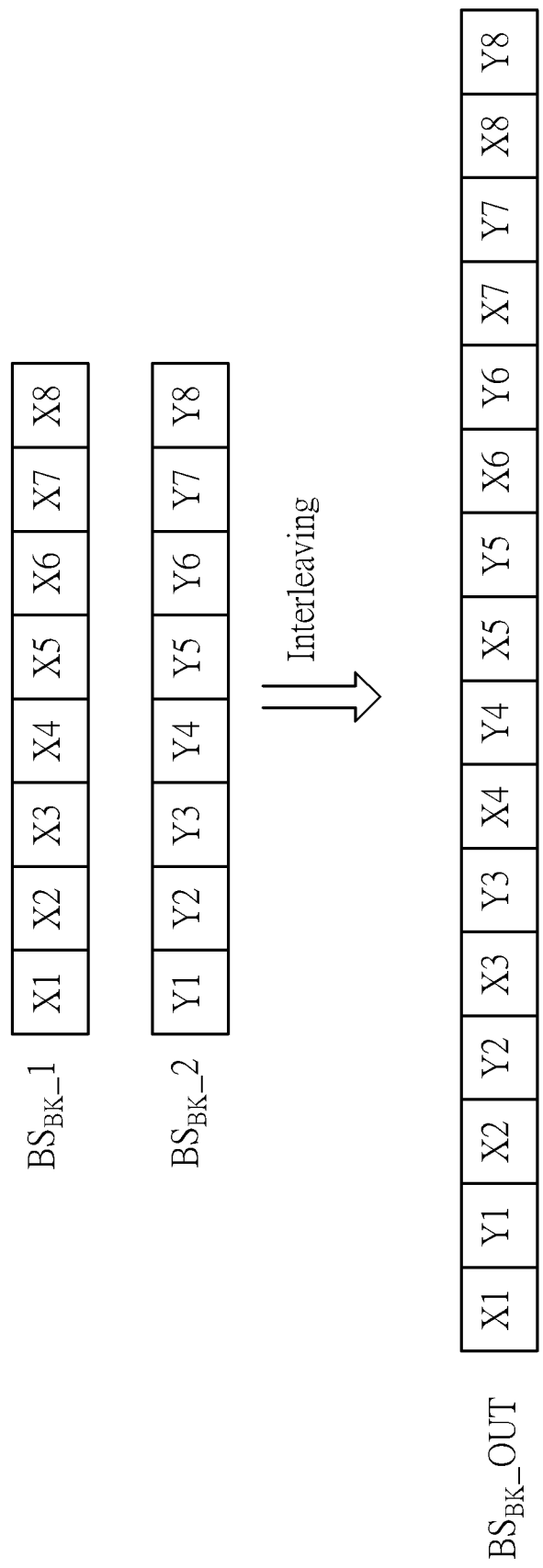
FIG. 11 is a diagram illustrating a first bitstream combining operation without dummy bit insertion according to an embodiment of the present invention.

FIG. 11 is a diagram illustrating a first bitstream combining operation without dummy bit insertion according to an embodiment of the present invention. Suppose that the encoding circuit 102 encodes one block BK into two compressed bitstream segments $BS_{BK\_}1$ and $BS_{BK\_}2$ (i.e., $BS_{BK\_}1$-$BS_{BK\_}N$, where N=2). As shown in FIG. 11, the compressed bitstream segment $BS_{BK\_}1$ includes bits X1-X8, and the compressed bitstream segment $BS_{BK\_}2$ includes bits Y1-Y8. The compressed bitstream segments $BS_{BK\_}1$ and $BS_{BK\_}2$ have the same bitstream length. In this embodiment, the interleaving circuit 110 performs a bit group based interleaving process upon the compressed bitstream segments $BS_{BK\_}1$ and $BS_{BK\_}2$ to generate an interleaved bitstream segment as a part of the output bitstream $BS_{BK\_}OUT$. According to the bit group based interleaving process, each of the compressed bitstream segments $BS_{BK\_}1$ and $BS_{BK\_}2$ is divided into a plurality of bit groups each having at least one bit, and the output bitstream $BS_{BK\_}OUT$ has consecutive bit groups belonging to different compressed bitstream segments, respectively. Each bit group acts as an interleaving unit. In this embodiment, each bit group has only a single bit. As shown in FIG. 11, the bit Y1 is inserted between bits X1 and X2, the bit Y2 is inserted between bits X2 and X3, and so on.

Figure 12:
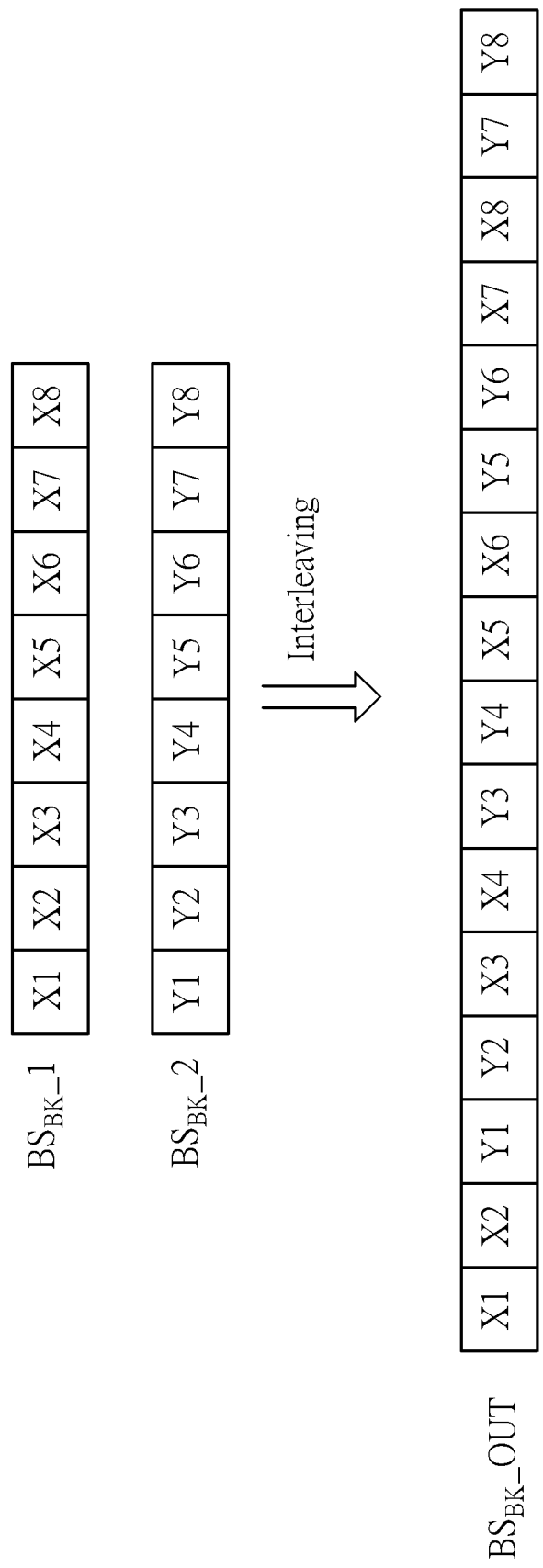
FIG. 12 is a diagram illustrating a second bitstream combining operation without dummy bit insertion according to an embodiment of the present invention.

It should be noted than the bit group size may be adjusted, depending upon the actual design consideration. Alternatively, each bit group may have more than one bit. FIG. 12 is a diagram illustrating a second bitstream combining operation without dummy bit insertion according to an embodiment of the present invention. According to the bit group based interleaving process, each of the compressed bitstream segments $BS_{BK\_}1$ and $BS_{BK\_}2$ is divided into a plurality of bit groups each having multiple bits, and the output bitstream $BS_{BK\_}OUT$ has consecutive bit groups belonging to different compressed bitstream segments, respectively. In this embodiment, each bit group has two bits. Hence, one bit group consisting of bits Y1 and Y2 is inserted between one bit group consisting of bits X1 and X2 and one bit group consisting of bits X3 and X4, one bit group consisting of bits Y3 and Y4 is inserted between one bit group consisting of bits X3 and X4 and one bit group consisting of bits X5 and X6, and so on.

As shown in FIG. 11 and FIG. 12, the compressed bitstream segment $BS_{BK\_}1$ generated from encoding one data partition of block data of a block and the compressed bitstream segment $BS_{BK\_}2$ generated from encoding the other data partition of block data of the block have the same bitstream length. However, this is for illustrative purposes only, and is not meant to be a limitation of the present invention. Since image contents of data partitions may have different complexity, compressed bitstream segments generated from encoding different data partitions may have unequal bitstream lengths. To achieve the compressed bitstream interleaving, the interleaving circuit 110 is further configured to support dummy bit insertion.

Figure 13:
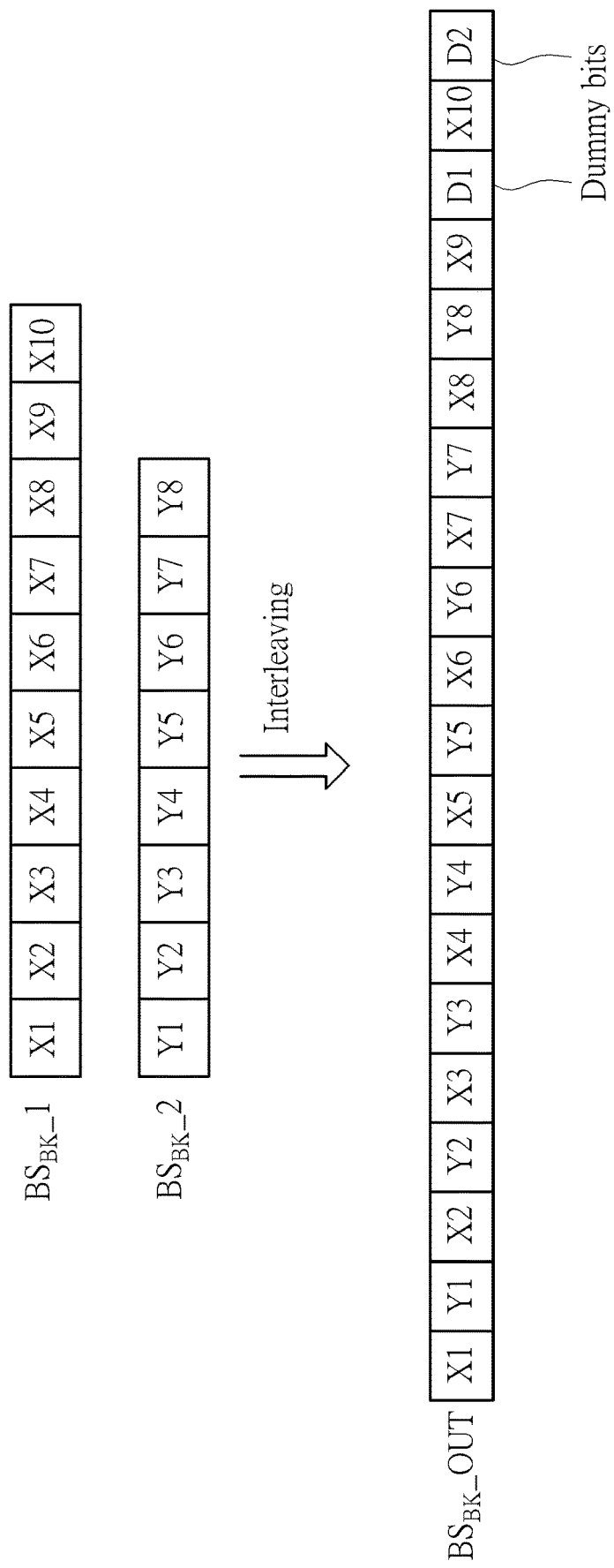
FIG. 13 is a diagram illustrating a first bitstream combining operation with dummy bit insertion according to an embodiment of the present invention.

FIG. 13 is a diagram illustrating a first bitstream combining operation with dummy bit insertion according to an embodiment of the present invention. As shown in FIG. 13, the compressed bitstream segment $BS_{BK\_}1$ includes bits X1-X10, and the compressed bitstream segment $BS_{BK\_}2$ includes bits Y1-Y8. The bitstream length of the compressed bitstream segment $BS_{BK\_}1$ is longer than the bitstream length of the compressed bitstream segment $BS_{BK\_}2$. In this embodiment, the interleaving circuit 110 performs a bit group based interleaving process with dummy bit insertion upon the compressed bitstream segments $BS_{BK\_}1$ and $BS_{BK\_}2$ to generate an interleaved bitstream segment as a part of the output bitstream $BS_{BK\_}OUT$. According to the bit group based interleaving process with dummy bit insertion, each of the compressed bitstream segments $BS_{BK}\_1$ and $BS_{BK}\_2$ is divided into a plurality of bit groups each having at least one bit, and the output bitstream $BS_{BK}\_OUT$ has consecutive bit groups belonging to different compressed bitstream segments, respectively, and further has consecutive bit groups belonging to one compressed bitstream segment and one dummy bit group, respectively. Each bit group acts as an interleaving unit. In this embodiment, each bit group has only a single bit. Since a difference between bitstream lengths of the compressed bitstream segments $BS_{BK}\_1$ and $BS_{BK}\_2$ is equal to two, two dummy bit groups, including a first dummy bit group (which includes only a single dummy bit D1) and a second dummy bit group (which includes only a single dummy bit D2), are inserted by the interleaving circuit 110. As shown in FIG. 13, one dummy bit D1 is inserted between bits X9 and X10, and the other dummy bit D2 is appended to bit X10.

Figure 14:
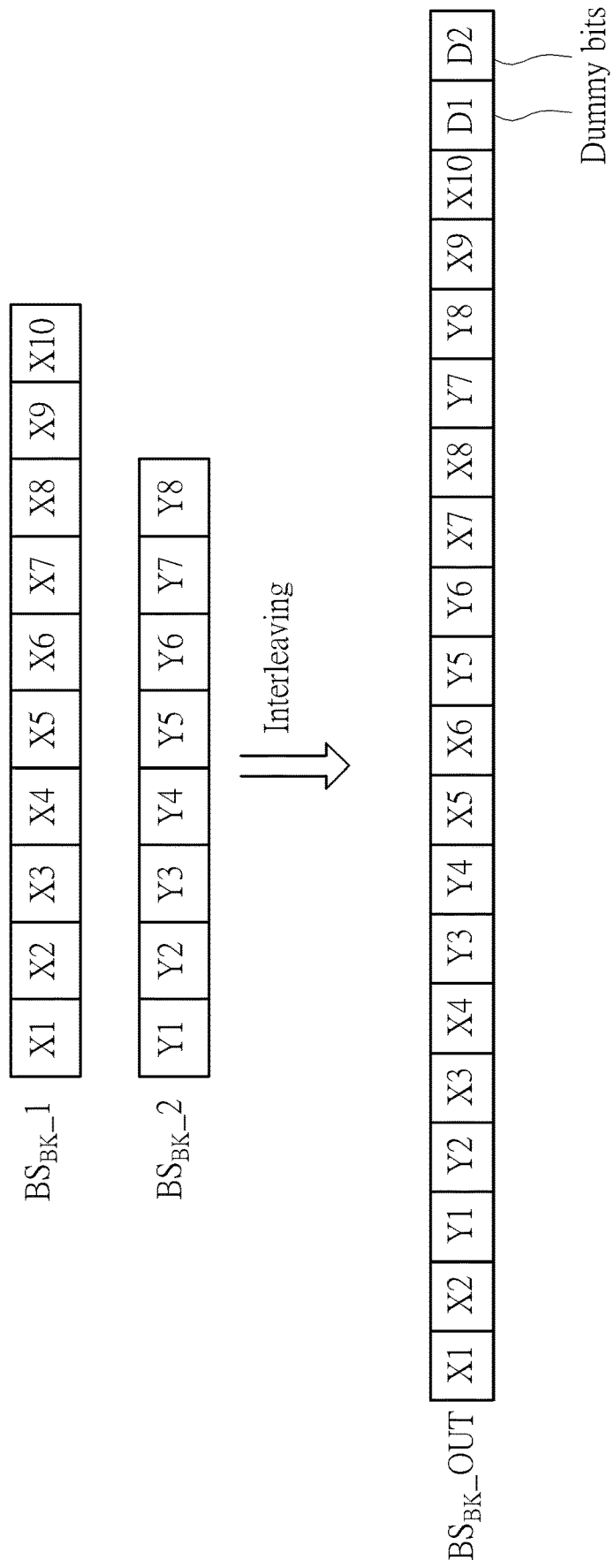
FIG. 14 is a diagram illustrating a second bitstream combining operation with dummy bit insertion according to an embodiment of the present invention.

FIG. 14 is a diagram illustrating a second bitstream combining operation with dummy bit insertion according to an embodiment of the present invention. As shown in FIG. 14, the compressed bitstream segment $BS_{BK}\_1$ includes bits X1-X10, and the compressed bitstream segment $BS_{BK}\_2$ includes bits Y1-Y8. The bitstream length of the compressed bitstream segment $BS_{BK}\_1$ is longer than the bitstream length of the compressed bitstream segment $BS_{BK}\_2$. In this embodiment, the interleaving circuit 110 performs a bit group based interleaving process with dummy bit insertion upon the compressed bitstream segments $BS_{BK}\_1$ and $BS_{BK}\_2$ to generate an interleaved bitstream segment as a part of the output bitstream $BS_{BK}\_OUT$. According to the bit group based interleaving process with dummy bit insertion, each of the compressed bitstream segments $BS_{BK}\_1$ and $BS_{BK}\_2$ is divided into a plurality of bit groups each having multiple bits, and the output bitstream $BS_{BK}\_OUT$ has consecutive bit groups belonging to different compressed bitstream segments, respectively, and further has consecutive bit groups belonging to one compressed bitstream segment and one dummy bit group, respectively. Each bit group acts as an interleaving unit. In this embodiment, each bit group has two bits. Since a different between bitstream lengths of the compressed bitstream segments $BS_{BK}\_1$ and $BS_{BK}\_2$ is equal to two, one dummy bit group (which includes two dummy bits D1 and D2) is inserted by the interleaving circuit 110. As shown in FIG. 14, the dummy bit group consisting of dummy bits D1 and D2 is appended to one bit group consisting of bits X9 and X10.

Figure 15:
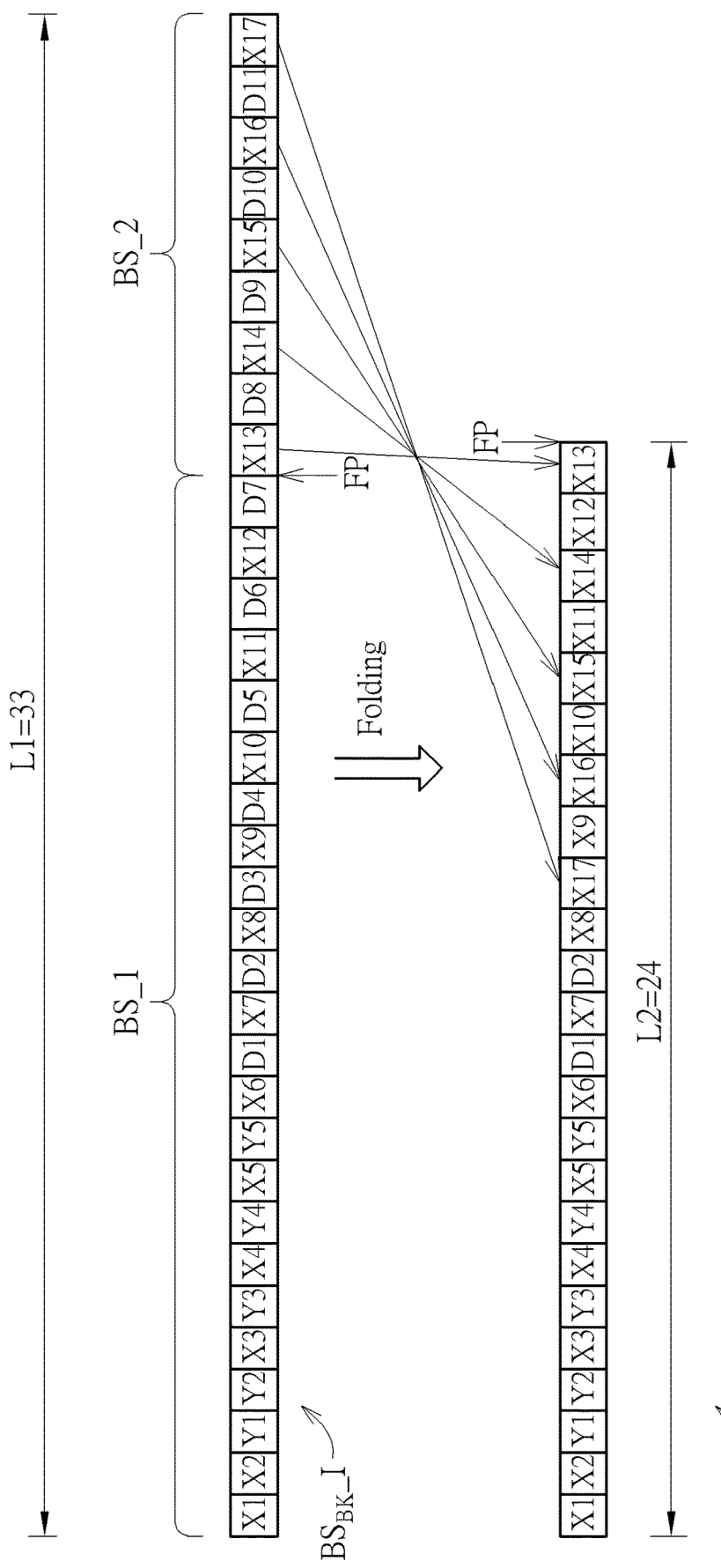
FIG. 15 is a diagram illustrating a first bitstream combining operation which performs an interleaving process with dummy bit insertion and a folding process according to an embodiment of the present invention.

When the difference between bitstream lengths of compressed bitstream segments is larger, more dummy bits are needed for achieving compressed bitstream interleaving, thus increasing the interleaving overhead. To mitigate the interleaving overhead, the folding circuit 112 of the combining circuit 104 can be activated to perform a bit group based folding process. FIG. 15 is a diagram illustrating a first bitstream combining operation which performs an interleaving process with dummy bit insertion and a folding process according to an embodiment of the present invention. An interleaved bitstream segment $BS_{BK}\_I$ with a bitstream length L1 (L1=33) is generated by a bit group based interleaving process with dummy bit insertion, where each bit group has only a single bit and acts as an interleaving unit, bits X1-X17 belong to a first compressed bitstream segment, bits Y1-Y5 belong to a second compressed bitstream segment, and dummy bits D1-D11 are inserted for achieving compressed bitstream interleaving. A bit group based folding process is applied to the interleaved bitstream segment $BS_{BK}\_I$ to generate a folded bitstream segment $BS_{BK}\_F$ with a bitstream length L2 (L2=24).

According to the bit group based folding process, the folded bitstream segment $BS_{BK}\_F$ is generated by folding the interleaved bitstream segment $BS_{BK}\_I$ at a folding point FP between a first bitstream segment BS_1 and a second bitstream segment BS_2 of the interleaved bitstream segment $BS_{BK}\_I$, where each dummy bit group included in the second bitstream segment BS_2 is discarded, and at least one bit group of the second bitstream segment BS_2 is moved to the first bitstream segment BS_1 for replacing at least one dummy bit group included in the first bitstream segment BS_1 with at least one bit group of the second bitstream segment BS_2. The output bitstream $BS_{BK}\_OUT$ is derived from at least the folded bitstream segment $BS_{BK}\_F$. In this embodiment, the second bitstream segment BS_2 includes five bits X13-X17 belonging to the first compressed bitstream segment and four dummy bits D8-D11 inserted by the bit group based interleaving process, where the bit X13 is closer to the folding point FP than the bit X14, the bit X14 is closer to the folding point FP than the bit X15, the bit X15 is closer to the folding point FP than the bit X16, and the bit X16 is closer to the folding point FP than the bit X17. The first bitstream segment BS_1 includes dummy bits D1-D7 inserted by the bit group based interleaving process, where the dummy bit D7 is closer to the folding point FP than the dummy bit D6, the dummy bit D6 is closer to the folding point FP than the dummy bit D5, the dummy bit D5 is closer to the folding point FP than the dummy bit D4, and the dummy bit D4 is closer to the folding point FP than the dummy bit D3. When the bit group folding process is applied to the interleaved bitstream segment $BS_{BK}\_I$, a dummy bit group consisting of the dummy bit D8 is discarded, a dummy bit group consisting of the dummy bit D9 is discarded, a dummy bit group consisting of the dummy bit D10 is discarded, a dummy bit group consisting of the dummy bit D11 is discarded, a dummy bit group consisting of the dummy bit D7 is replaced by a bit group consisting of the bit X13, a dummy bit group consisting of the dummy bit D6 is replaced by a bit group consisting of the bit X14, a dummy bit group consisting of the dummy bit D5 is replaced by a bit group consisting of the bit X15, a dummy bit group consisting of the dummy bit D4 is replaced by a bit group consisting of the bit X16, and a dummy bit group consisting of the dummy bit D3 is replaced by a bit group consisting of the bit X17. Since the bitstream length L2 (L2=24) of the folded bitstream segment $BS_{BK}\_F$ is shorter than the bitstream length L1 (L1=33) of the interleaved bitstream segment $BS_{BK}\_I$, the interleaving overhead can be effectively reduced by the bit group based folding process.

It should be noted that an execution order of a bit group based interleaving process and a bit group based folding process can be adjusted, depending upon the actual implementation considerations. In one exemplary design, the combining circuit 104 may perform interleaving first and then folding. In another exemplary design, the combining circuit 104 may perform folding first and then interleaving. It should be noted that the same output bitstream $BS_{BK}\_OUT$ is generated regardless of the execution order of interleaving and folding.

Figure 16:
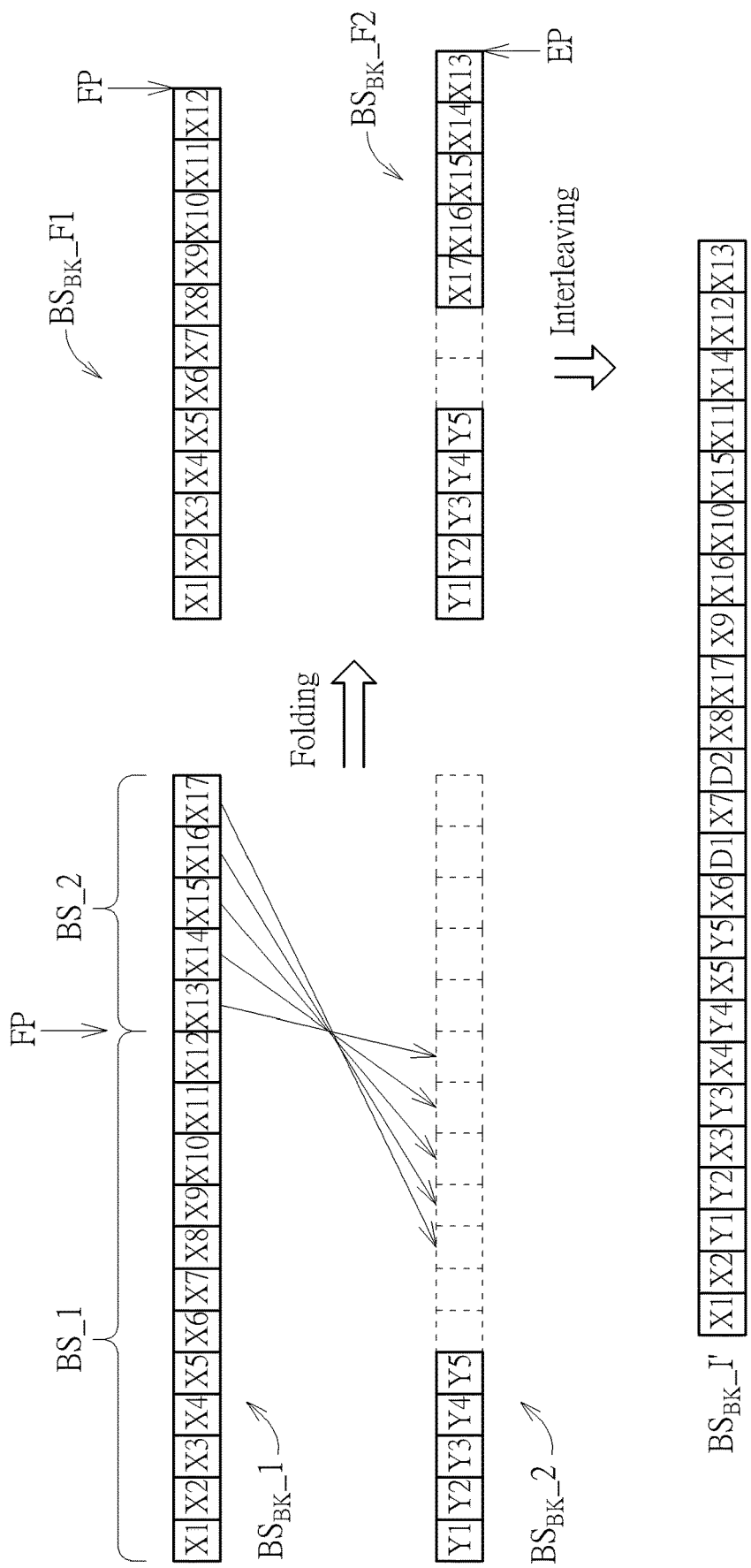
FIG. 16 is a diagram illustrating a second bitstream combining operation which performs an interleaving process with dummy bit insertion and a folding process according to an embodiment of the present invention.

FIG. 16 is a diagram illustrating a second bitstream combining operation which performs an interleaving process with dummy bit insertion and a folding process according to an embodiment of the present invention. The combining circuit 104 generates an interleaved bitstream segment $BS_{BK}\_I$ by combining two compressed bitstream segments $BS_{BK}\_1$ and $BS_{BK}\_2$. The first compressed bitstream segment $BS_{BK}\_1$ includes bits X1-X17. The second compressed bitstream segment $BS_{BK}\_2$ includes bits Y1-Y5.

The bitstream length of the first compressed bitstream segment $BS_{BK\_}1$ is longer than the bitstream length of the second compressed bitstream segment $BS_{BK\_}2$. In this embodiment, the folding circuit 112 performs a bit group based folding process under a condition that each bit group has only a single bit. According to the bit group based folding process, the first compressed bitstream $BS_{BK\_}1$ is folded at a folding point FP between a first bitstream segment BS_1 and a second bitstream segment BS_2, where a first folded bitstream segment $BS_{BK\_}F1$ is generated by removing the second bitstream segment BS_2 from the first compressed bitstream segment $BS_{BK\_}1$, and a second folded bitstream segment $BS_{BK\_}F2$ is generated by adding the second bitstream segment BS_2 to the second compressed bitstream segment $BS_{BK\_}2$.

As shown in FIG. 16, the second folded bitstream segment $BS_{BK\_}F2$ includes bits X13-X17 originally belonging to the first compressed bitstream segment $BS_{BK\_}1$. Regarding the first compressed bitstream segment $BS_{BK\_}1$, the bit X13 is closer to the folding point FP than the bit X14, the bit X14 is closer to the folding point FP than the bit X15, the bit X16 is closer to the folding point FP than the bit X15, and the bit X16 is closer to the folding point FP than the bit X17. Regarding the second folded bitstream segment $BS_{BK\_}F2$, the bit X13 is closer to an end point EP of the second folded bitstream segment $BS_{BK\_}F2$ than the bit X14, the bit X14 is closer to the end point EP than the bit X15, the bit X16 is closer to the end point EP than the bit X15, and the bit X16 is closer to the end point EP than the bit X17.

In this embodiment, the interleaving circuit 110 performs a bit group based interleaving process under a condition that each bit group has only a single bit. The bit group based interleaving process is applied to the first folded bitstream segment $BS_{BK\_}F1$ and the second folded bitstream segment $BS_{BK\_}F2$ to generate an interleaved bitstream segment $BS_{BK\_}I$, where the output bitstream $BS_{BK\_}OUT$ is derived from the interleaved bitstream segment $\overline{BS}_{BK\_}I'$. Since the end point EP of the second folded bitstream segment $BS_{BK\_}F2$ is aligned with the folding point FP (which is also an end point of the first folded bitstream segment $BS_{BK\_}F1$), the second folded bitstream segment $BS_{BK\_}F2$ has two empty bit locations between bits Y5 and X17. Hence, two dummy bits D1 and D2 are added by the bit group based interleaving process for achieving compressed bitstream interleaving, where the dummy bit D1 is inserted between bits X6 and X7, and the dummy bit D2 is inserted between bits X7 and X8. As illustrated in FIG. 15 and FIG. 16, the folded bitstream segment $BS_{BK\_}F$ (which is generated by performing interleaving first and then folding) is the same as the interleaved bitstream segment $BS_{BK\_}I'$ (which is generated by performing folding first and then interleaving).

The best folding point FP shown in FIG. 14/FIG. 15 can be determined by using following formulas.

$$(A+B) \leq Z \quad (1)$$

$$Z = M*P \quad (2)$$

In above formulas (1) and (2), A represents the number of bits in a first compressed bitstream segment (e.g., $BS_{BK\_}1$), B represents the number of bits in a second compressed bitstream segment (e.g., $BS_{BK\_}2$), Z represents the number of bits in an output bitstream segment (e.g., $BK_{BK\_}F$ or $BS_{BK\_}I'$), M represents a positive integer, and P represents the number of bits in one packet size unit. The combining circuit 104 finds a smallest value of Z that can satisfy both of formulas (1) and (2). After the smallest value of Z is found, the best folding point FP can be derived from Z.

Taking the embodiment shown in FIG. 14/FIG. 15 for example, A=17 and B=5. Assuming that P=8, the smallest Z for the best folding point is 24 (i.e., Z=3*8≥(17+5)).

The entropy encoder 106 outputs a plurality of compressed bitstream segments $BS_{BK\_}1$-$BS_{BK\_}N$ for one block BK. In a case where the entropy encoder 106 outputs more than two compressed bitstream segments (N>2), a folding direction may be employed by a bit group based folding process, where a compressed bitstream segment can be folded to another compressed bitstream segment if the compressed bitstream segment has bit(s) beyond a folding point, and a compressed bitstream segment can be folded from another compressed bitstream segment if another compressed bitstream segment has bit(s) beyond a folding point. In a case where an implicit mode is used, the selected folding direction is pre-defined in the encoding apparatus 100 and a decoding apparatus, such that information of the folding direction used by the encoding apparatus 100 is not signaled to the decoding apparatus. In another case where an explicit mode is used, header information signaled to a decoding apparatus includes information of the folding direction used by the encoding apparatus 100.

Figure 17:
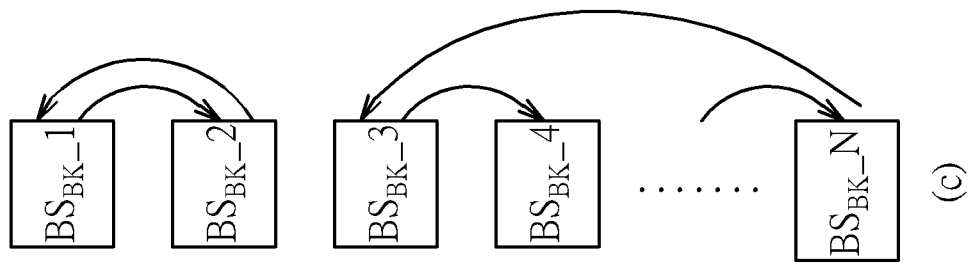
FIG. 17 is a diagram illustrating a plurality of folding directions according to an embodiment of the present invention.
Figure 17:
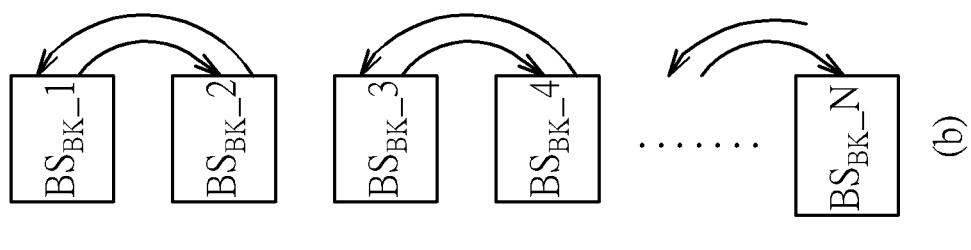
Figure 17:
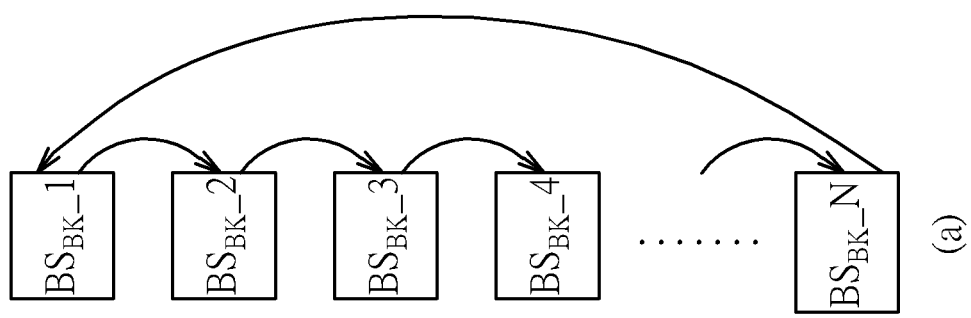

FIG. 17 is a diagram illustrating a plurality of folding directions according to an embodiment of the present invention. The sub-diagram (a) of FIG. 17 shows a folding direction with a sequential order. The sub-diagram (b) of FIG. 17 shows a folding direction with folding between every two bitstream segments. The sub-diagram (c) of FIG. 17 shows a folding direction with an arbitrary order. However, these are for illustrative purposes only, and are not meant to be limitations of the present invention.

Figure 18:
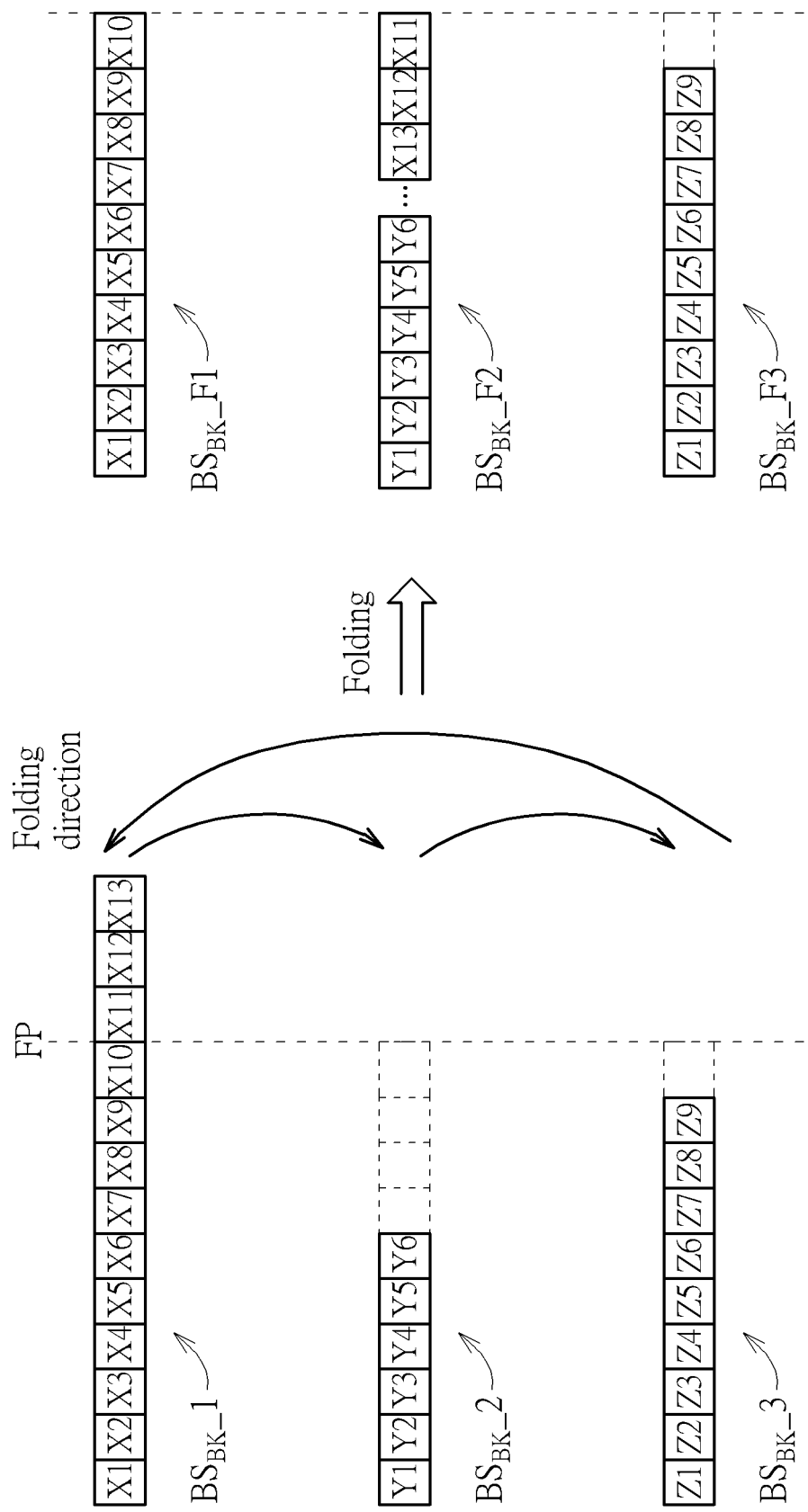
FIG. 18 is a diagram illustrating a bit group based folding process that uses a folding direction shown in sub-diagram (a) of FIG. 17 for folding three compressed bitstream segments according to an embodiment of the present invention.

FIG. 18 is a diagram illustrating a bit group based folding process that uses a folding direction shown in sub-diagram (a) of FIG. 17 for folding three compressed bitstream segments according to an embodiment of the present invention. The compressed bitstream segment $BS_{BK\_}1$ includes bits X1-X13. The compressed bitstream segment $BS_{BK\_}2$ includes bits Y1-Y6. The compressed bitstream segment $BS_{BK\_}3$ includes bits Z1-Z9. The best folding point FP shown in FIG. 18 can be determined by using following formulas.

$$(A+B+C) \leq Z \quad (1)$$

$$(A+B) \leq 2*Z/3 \| (B+C) \leq 2*Z/3 \| (C+A) \leq 2*Z/3 \quad (2)$$

$$Z = M*P \quad (3)$$

In above formulas (1), (2) and (3), A represents the number of bits in a first compressed bitstream segment (e.g., $BS_{BK\_}1$), B represents the number of bits in a second compressed bitstream segment (e.g., $BS_{BK\_}2$), C represents the number of bits in a third compressed bitstream segment (e.g., $BS_{BK\_}3$), Z represents the number of bits in an output bitstream segment, M represents a positive integer, and P represents the number of bits in one packet size unit. The combining circuit 104 finds a smallest value of Z that can satisfy all of formulas (1)-(3). After the smallest value of Z is found, the best folding point FP can be derived from Z.

As shown in FIG. 18, the compressed bitstream segment $BS_{BK\_}1$ has bits beyond the folding point FP, and none of the compressed bitstream segments $BS_{BK\_}2$ and $BS_{BK\_}3$ has bits beyond the folding point FP. Hence, according to the folding direction, only the first compressed bitstream segment $BS_{BK\_}1$ is folded at the folding point FP. According to the bit group based folding process, a folded bitstream segment $BS_{BK\_}F1$ is generated by removing bits X11-X13 from the compressed bitstream segment $BS_{BK\_}1$, a folded bitstream segment $BS_{BK\_}F2$ is generated by adding bits X11-X13 (which originally belong to the first compressed bitstream segment $BS_{BK\_}1$) to the compressed bitstream segment $BS_{BK\_}2$, and a folded bitstream segment $BS_{BK\_}F3$ is the same as the third compressed bitstream segment $BS_{BK\_}3$. Regarding the compressed bitstream segment $BS_{BK\_}1$, the bit X11 is closer to the folding point FP than the bit X12, and the bit X12 is closer to the folding point FP than the bit X13. Regarding the folded bitstream segment $BS_{BK\_}F2$, the bit X11 is closer to an end point of the folded bitstream segment $BS_{BK\_}F2$ than the bit X12, and the bit X12 is closer to the end point of the folded bitstream segment $BS_{BK\_}F2$ than the bit X13.

Figure 19:
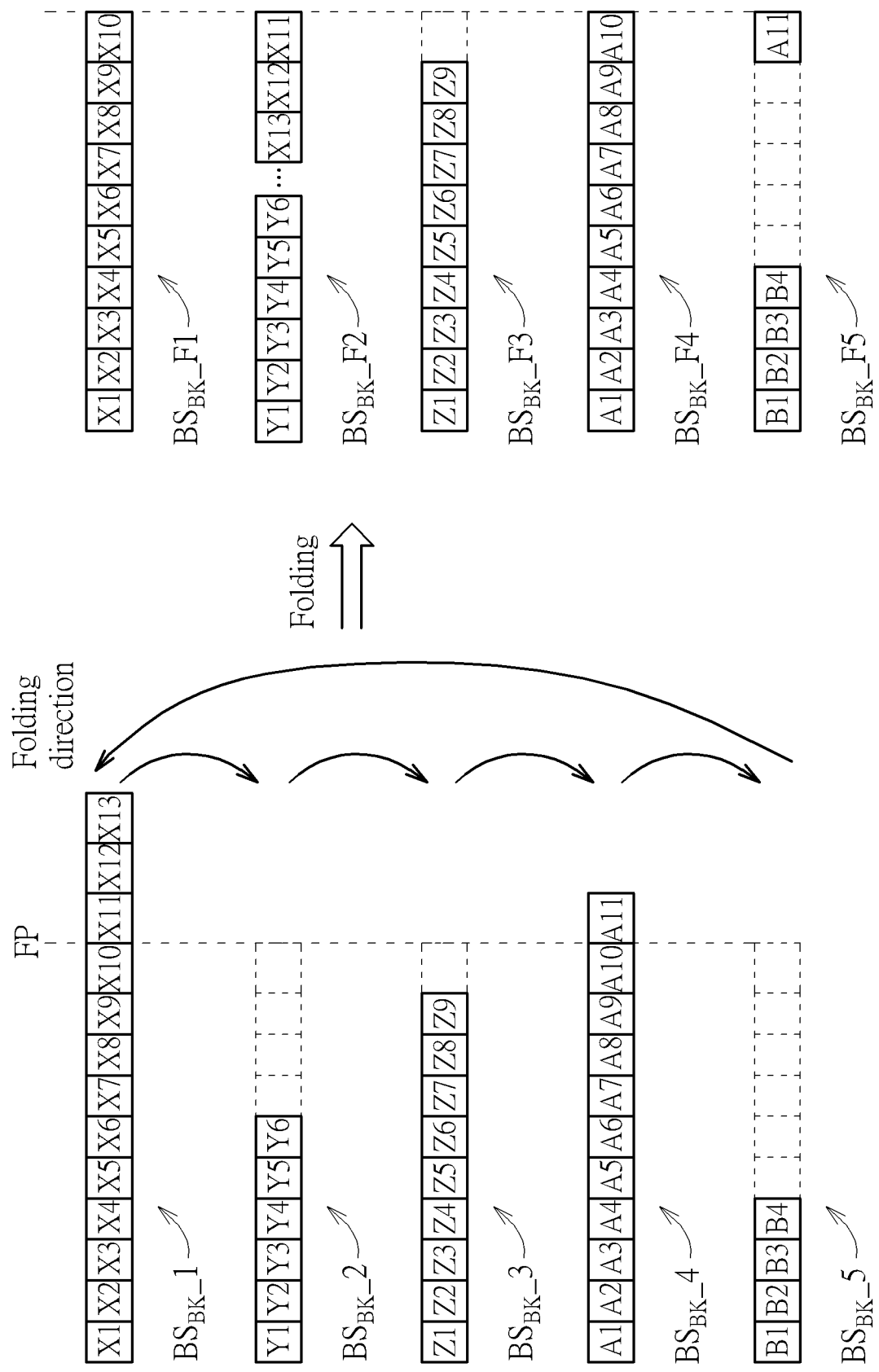
FIG. 19 is a diagram illustrating a bit group based folding process that uses a folding direction shown in sub-diagram (a) of FIG. 17 for folding five compressed bitstream segments according to an embodiment of the present invention.

FIG. 19 is a diagram illustrating a bit group based folding process that uses a folding direction shown in sub-diagram (a) of FIG. 17 for folding five compressed bitstream segments according to an embodiment of the present invention. The compressed bitstream segment $BS_{BK\_}1$ includes bits X1-X13. The compressed bitstream segment $BS_{BK\_}2$ includes bits Y1-Y6. The compressed bitstream segment $BS_{BK\_}3$ includes bits Z1-Z9. The compressed bitstream segment $BS_{BK\_}4$ includes bits A1-A11. The compressed bitstream segment $BS_{BK\_}5$ includes bits B1-B4. As shown in FIG. 18, both of the compressed bitstream segments $BS_{BK\_}1$ and $BS_{BK\_}4$ have bits beyond the folding point FP, and none of the compressed bitstream segments $BS_{BK\_}2$, $BS_{BK\_}3$, and $BS_{BK\_}5$ has bits beyond the folding point FP. Hence, according to the folding direction, only the compressed bitstream segments $BS_{BK\_}1$ and $BS_{BK\_}4$ are folded at the folding point FP. According to the bit group based folding process, a folded bitstream segment $BS_{BK\_}F1$ is generated by removing bits X11-X13 from the compressed bitstream segment $BS_{BK\_}1$, a folded bitstream segment $BS_{BK\_}F2$ is generated by adding bits X11-X13 (which originally belong to the compressed bitstream segment $BS_{BK\_}1$) to the compressed bitstream segment $BS_{BK\_}2$, a folded bitstream segment $BS_{BK\_}F3$ is the same as the compressed bitstream segment $BS_{BK\_}3$, a folded bitstream segment $BS_{BK\_}F4$ is generated by removing the bit A11 from the compressed bitstream segment $BS_{BK\_}4$, and a folded bitstream segment $BS_{BK\_}F5$ is generated by adding the bit A11 (which originally belongs to the compressed bitstream segment $BS_{BK\_}4$) to the compressed bitstream segment $BS_{BK\_}5$. Regarding the compressed bitstream segment $BS_{BK\_}1$, the bit X11 is closer to the folding point FP than the bit X12, and the bit X12 is closer to the folding point FP than the bit X13. Regarding the folded bitstream segment $BS_{BK\_}F2$, the bit X11 is closer to an end point of the folded bitstream segment $BS_{BK\_}F2$ than the bit X12, and the bit X12 is closer to the end point of the folded bitstream segment $BS_{BK\_}F2$ than the bit X13.

In an exemplary bitstream combining design with interleaving, the combining circuit 104 may be configured to apply interleaving to all of the compressed bitstream segments $BS_{BK\_}1$-$BS_{BK\_}N$ of a block for generating an interleaved bitstream segment, where the output bitstream $BS_{BK\_}OUT$ of the block is derived from the interleaved bitstream segment. In one exemplary bitstream combining design with interleaving and folding, the combining circuit 104 may be configured to apply interleaving to all of the compressed bitstream segments $BS_{BK\_}1$-$BS_{BK\_}N$ of a block for generating an interleaved bitstream segment and then apply folding to the interleaved bitstream segment for generating a folded bitstream segment, where the output bitstream $BS_{BK\_}OUT$ of the block is derived from the folded bitstream segment. In another exemplary bitstream combining design with interleaving and folding, the combining circuit 104 may be configured to apply folding to all of the compressed bitstream segments $BS_{BK\_}1$-$BS_{BK\_}N$ of a block for generating folded bitstream segments and then apply interleaved bitstream segment to all of the folded bitstream segments for generating an interleaved bitstream segment, where the output bitstream $BS_{BK\_}OUT$ of the block is derived from the interleaved bitstream segment. Alternatively, a hierarchical interleaving procedure and/or a hierarchical folding procedure may be involved in generating an output bitstream of each block in an image.

Figure 20:
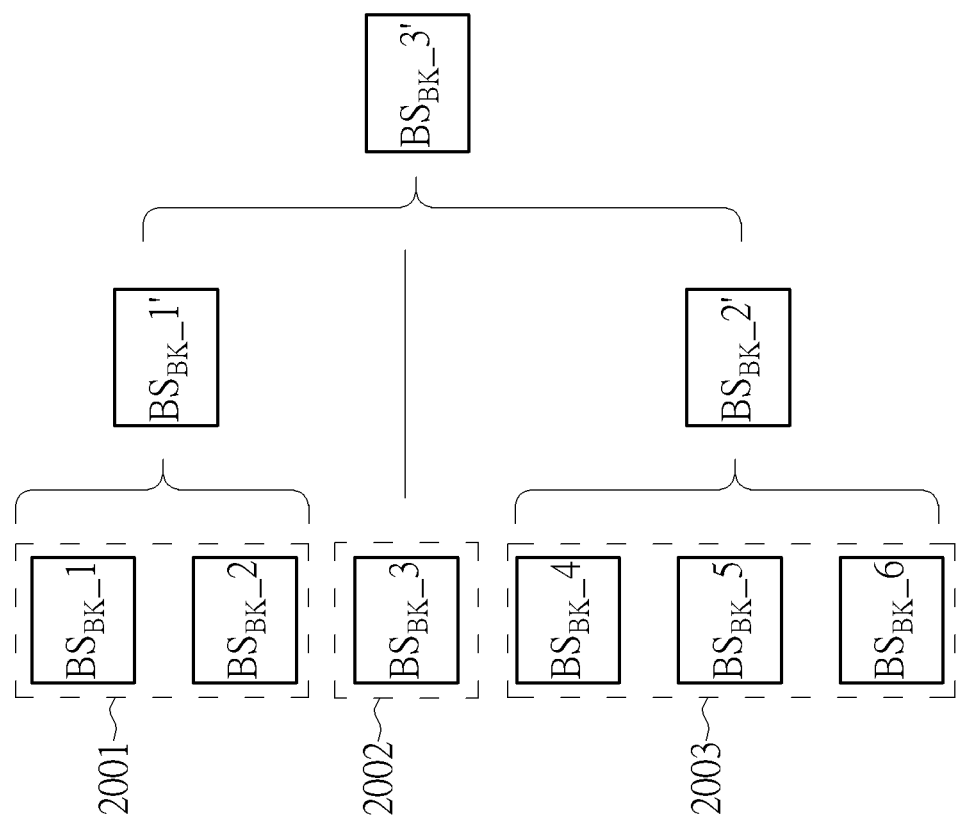
FIG. 20 is a diagram illustrating a hierarchical encoding operation according to an embodiment of the present invention.

FIG. 20 is a diagram illustrating a hierarchical encoding operation according to an embodiment of the present invention. Suppose that one block BK of the image 10 may be encoded by the encoding circuit 102 to generate compressed bitstream segments $BS_{BK\_}1$-$BS_{BK\_}6$. In an encoding operation with hierarchical interleaving, the combining circuit 104 categorizes the compressed bitstream segments $BS_{BK\_}1$-$BS_{BK\_}6$ into a plurality of compressed bitstream segment groups each having at least one compressed bitstream segment. As shown in FIG. 20, a compressed bitstream segment group 2001 includes compressed bitstream segments $BS_{BK\_}1$ and $BS_{BK\_}2$, a compressed bitstream segment group 2002 includes the compressed bitstream segment $BS_{BK\_}3$ only, and a compressed bitstream segment group 2003 includes compressed bitstream segments $BS_{BK\_}4$, $BS_{BK\_}5$, and $BS_{BK\_}6$. The interleaving circuit 110 applies a bit group based interleaving process to the compressed bitstream segment group 2001 to generate a bitstream segment $BS_{BK\_}1'$ (which is an interleaved bitstream segment), applies a bit group based interleaving process to the compressed bitstream segment group 2003 to generate a bitstream segment $BS_{BK\_}2'$ (which is an interleaved bitstream segment), and applies a bit group based interleaving process to the compressed bitstream segment group 2002 (which includes only a single compressed bitstream segment $BS_{BK\_}3$) and the bitstream segments $BS_{BK\_}1'$ and $BS_{BK\_}2'$ (which are interleaved bitstream segments) to generate a bitstream segment $BS_{BK\_}3'$ (which is an interleaved bitstream segment), where the output bitstream $BS_{BK\_}OUT$ of one block BK is derived from the bitstream segment $BS_{BK\_}3'$.

In one encoding operation with hierarchical interleaving and folding, the combining circuit 104 categorizes the compressed bitstream segments $BS_{BK\_}1$-$BS_{BK\_}6$ into a plurality of compressed bitstream segment groups (e.g., 2001, 2002, and 2003). The interleaving circuit 110 applies a bit group based interleaving process to the compressed bitstream segment group 2001 for generating a first interleaved bitstream segment (which includes bits of the compressed bitstream segments $BS_{BK\_}1$ and $BS_{BK\_}2$ and at least one dummy bit), and then the folding circuit 112 applies a bit group based folding process to the first interleaved bitstream segment for generating a bitstream segment $BS_{BK\_}1'$ (which is a folded bitstream segment). The interleaving circuit 110 applies a bit group based interleaving process to the compressed bitstream segment group 2003 to generate a second interleaved bitstream segment (which includes bits of the compressed bitstream segments $BS_{BK\_}4$-$BS_{BK\_}6$ and at least one dummy bit), and then the folding circuit 112 applies a bit group based folding process to the second interleaved bitstream segment to generate a bitstream segment $BS_{BK\_}2'$ (which is a folded bitstream segment). The interleaving circuit 110 applies a bit group based interleaving process to the compressed bitstream segment group 2002 (which includes only a single compressed bitstream segment $BS_{BK\_}3$) and the bitstream segments $BS_{BK\_}1'$ and $BS_{BK\_}2'$ (which are folded bitstream segments) to generate a third interleaved bitstream segment (which includes bits of the compressed bitstream segment $BS_{BK\_}3$, bits of the bitstream segments $BS_{BK\_}1'$ and $BS_{BK\_}2'$, and at least one dummy bit), and then the folding circuit 112 applies a bit group based folding process to the third interleaved bitstream segment to generate a bitstream segment $BS_{BK\_}3'$ (which is a folded bitstream segment), where the output bitstream $BS_{BK\_}OUT$ of one block BK is derived from the bitstream segment $BS_{BK\_}3'$.

In another encoding operation with hierarchical interleaving and folding, the combining circuit 104 categorizes the compressed bitstream segments $BS_{BK\_}1$-$BS_{BK\_}6$ into a plurality of compressed bitstream segment groups (e.g., 2001, 2002, and 2003). The folding circuit 112 applies a bit group based folding process to the compressed bitstream segment group 2001 to generate a first folded bitstream segment group that includes multiple folded bitstream segments, and then the interleaving circuit 110 applies a bit group based interleaving process to the first folded bitstream segment group to generate a bitstream segment $BS_{BK\_}1'$ (which is an interleaved bitstream segment). The folding circuit 112 applies a bit group based folding process to the compressed bitstream segment group 2003 to generate a second folded bitstream segment group that includes multiple folded bitstream segments, and then the interleaving circuit 110 applies a bit group based interleaving process to the second folded bitstream segment group to generate a bitstream segment $BS_{BK\_}2'$ (which is an interleaved bitstream segment). The folding circuit 112 applies a bit group based folding process to the compressed bitstream segment group 2002 (which includes only a single compressed bitstream segment $BS_{BK\_}3$) and the bitstream segments $BS_{BK\_}1'$ and $BS_{BK\_}2'$ (which are interleaved bitstream segments) to generate a third folded bitstream segment group that includes multiple folded bitstream segments, and then the interleaving circuit 110 applies a bit group based interleaving process to the third folded bitstream segment group to generate a bitstream segment $BS_{BK\_}3'$ (which is an interleaved bitstream segment), where the output bitstream $BS_{BK\_}OUT$ of one block BK is derived from the bitstream segment $BS_{BK\_}3'$.

Figure 21:
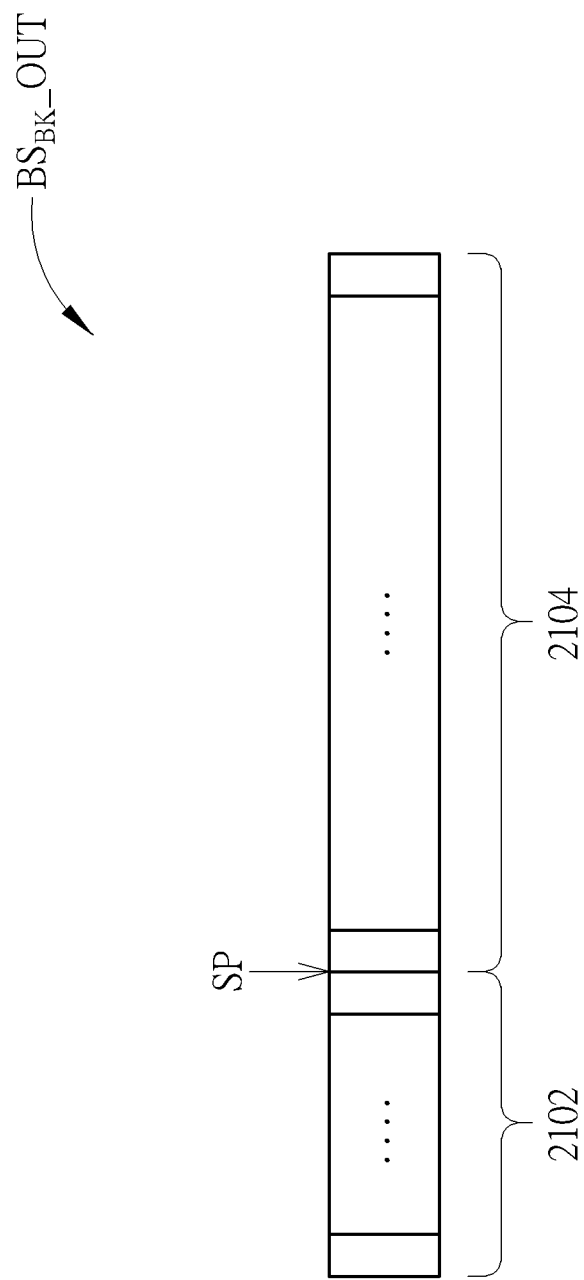
FIG. 21 is a diagram illustrating an output bitstream of one block in an image according to an embodiment of the present invention.

In addition to bits of compressed bitstream segments $BS_{BK\_}1$-$BS_{BK\_}N$ and/or dummy bit(s) added by the combining circuit 104 (particularly, the interleaving circuit 110), the output bitstream $BS_{BK\_}OUT$ may further include a non-interleaved bitstream segment. FIG. 21 is a diagram illustrating an output bitstream of one block in an image according to an embodiment of the present invention. In this example, the output bitstream $BS_{BK\_}OUT$ includes a leading bitstream segment 2102 and an interleaved bitstream segment 2104 immediately following the leading bitstream segment 2102. The interleaved bitstream segment 2104 may be generated by interleaving with/without folding. The leading bitstream segment 2102 is inserted to a start point SP of the interleaved bitstream segment 2104 without undergoing any bit group based interleaving process. The leading bitstream segment 2102 may include one or more bits, and may be used to record header information for the compression process, fixed-sized partial bit data of compressed bitstream segments, interleaving information related to the interleaved bitstream segment 2104, folding information, and/or bitstream length of the output bitstream $BS_{BK\_}OUT$.

The output bitstream $BS_{BK\_}OUT$ generated from the encoding apparatus 100 may be transmitted to a decoding apparatus to act as an input bitstream to be decoded for video playback. In a case where an interleaving procedure is involved in generating the output bitstream $BS_{BK\_}OUT$, a de-interleaving procedure is needed by the decoding apparatus. In another case where an interleaving procedure and a folding procedure are both involved in generating the output bitstream $BS_{BK\_}OUT$, a de-interleaving procedure and an un-folding procedure are both needed by the decoding apparatus.

Figure 22:
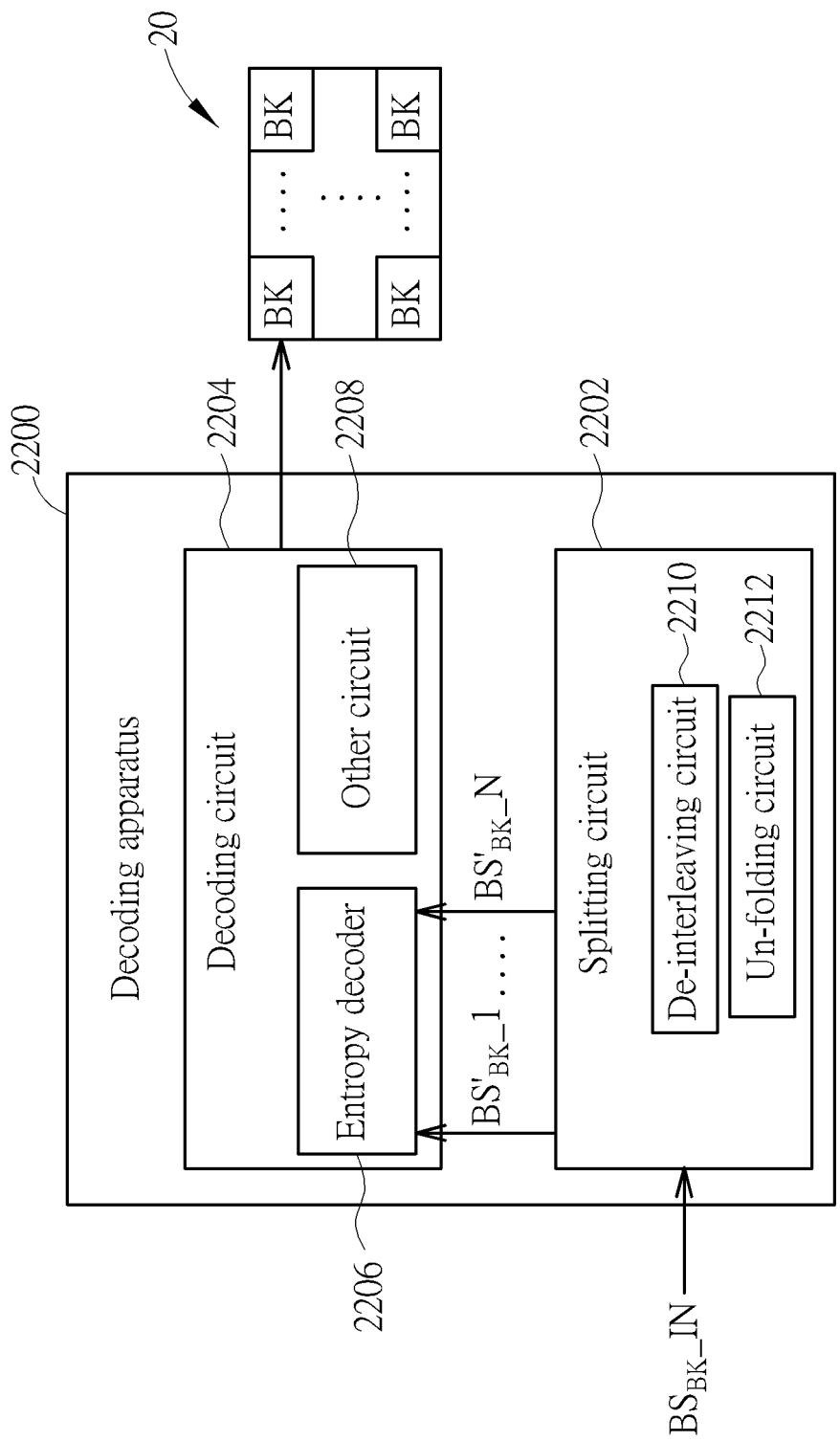
FIG. 22 is a diagram illustrating a decoding apparatus according to an embodiment of the present invention.

FIG. 22 is a diagram illustrating a decoding apparatus according to an embodiment of the present invention. The decoding apparatus 2200 may be a part of a video decoder. The decoding apparatus 2200 is arranged to decode an input bitstream $BS_{BK\_}IN$ of a block BK in an image 20. For example, the input bitstream $BS_{BK\_}IN$ is the output bitstream $BS_{BK\_}OUT$ generated from the encoding apparatus 100 and received by the decoding apparatus 2200. Hence, the image 20 is one decoded image of an output video sequence. The splitting circuit 2202 is arranged to derive a plurality of compressed bitstream segments $BS'_{BK\_}1$-$BS'_{BK\_}N$ (N>1) from the input bitstream $BS_{BK\_}IN$. Regarding each block BK of the image 20, the decoding circuit 2204 is arranged to fully/partially decode the compressed bitstream segments $BS'_{BK\_}1$-$BS'_{BK\_}N$ to obtain a plurality of data partitions of block data of the block BK.

The decoding circuit 2202 includes an entropy decoder 2206, and further include other circuitry 2208 needed to achieve the designated decoding function. For example, other circuitry 2208 may include a motion compensation circuit, an inverse quantization circuit, an inverse transform circuit, a reconstruct circuit, at least one in-loop filter, etc. Considering a case where entropy encoding of symbols derived from one data partition of a block is independent of entropy encoding of symbols derived from another data partition of the block, the entropy decoder 2206 may be configured to have a plurality of entropy decoding circuits for entropy decoding the compressed bitstream segments $BS'_{BK\_}1$-$BS'_{BK\_}N$ in a parallel manner, thereby increasing the decoding throughput.

In this embodiment, the splitting circuit 2202 includes a de-interleaving circuit 2210 and an un-folding circuit 2212, where the de-interleaving circuit 2210 is arranged to perform a bit group based de-interleaving process, and the un-folding circuit 112 is arranged to perform an un-folding process. Further details of the bit group based de-interleaving process and the un-folding process are described with reference to the accompanying drawings.

Figure 23:
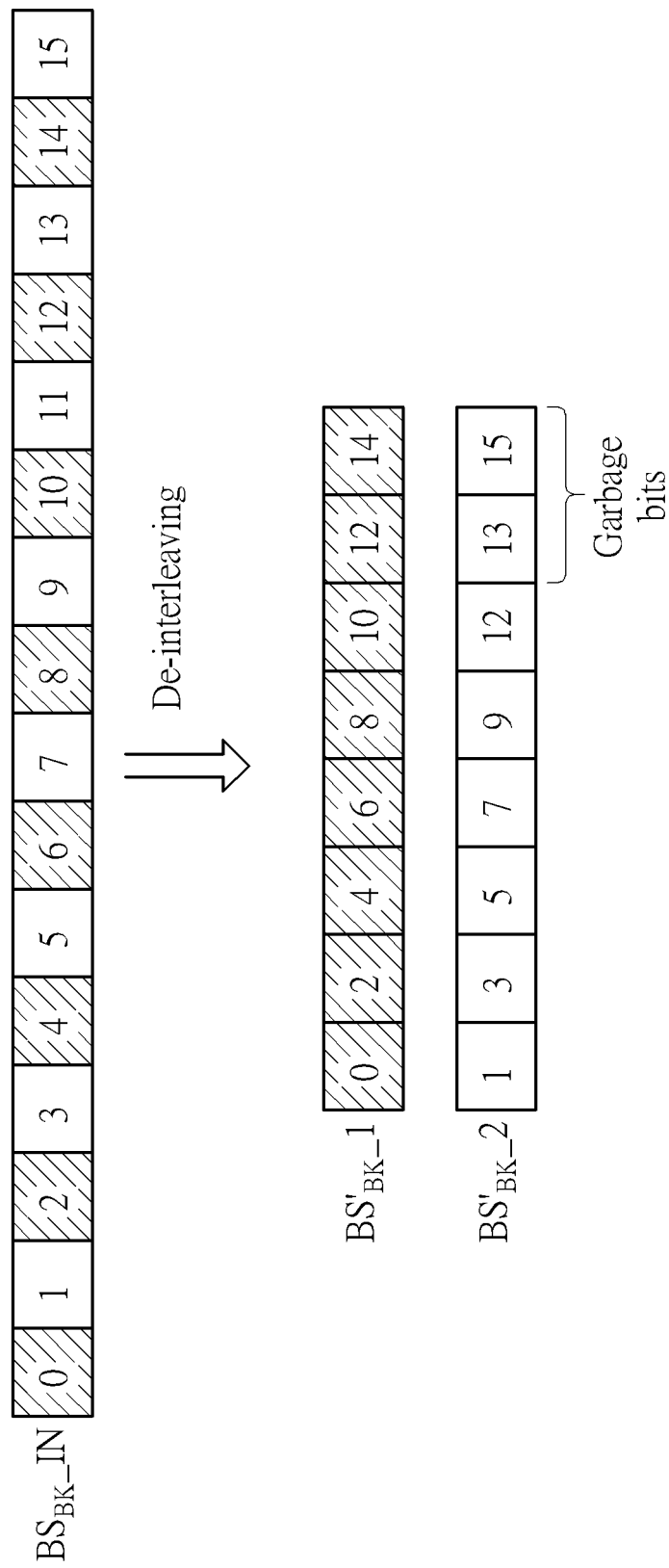
FIG. 23 is a diagram illustrating a first bitstream splitting operation according to an embodiment of the present invention.

FIG. 23 is a diagram illustrating a first bitstream splitting operation according to an embodiment of the present invention. Suppose that the encoding apparatus 100 generates the output bitstream $BS_{BK\_}OUT$ (which acts as the input bitstream $BS_{BK\_}IN$ of the decoding apparatus 2200) by applying a bit group based interleaving process to two compressed bitstream segments $BS_{BK\_}1$ and $BS_{BK\_}2$, where each bit group has only a single bit. Hence, the de-interleaving circuit 2210 applies a bit group based de-interleaving process to the input bitstream $BS_{BK\_}IN$. According to the bit group based de-interleaving process, the input bitstream $BS_{BK\_}IN$ is divided into a plurality of bit groups, and consecutive bit groups in the input bitstream $BS_{BK\_}IN$ are dispatched to different compressed bitstream segments, respectively. Since each bit group has only a single bit, the compressed bitstream segment $BS'_{BK\_}1$ has bits labeled by "0", "2", "4", "6", "8", "10", "12", and "14", and the compressed bitstream segment $BS'_{BK\_}2$ has bits labeled by "1", "3", "5", "7", "9", "11", "13", and "15".

A compressed bitstream segment obtained from a de-interleaving process may be fully decoded or partially decoded, depending upon whether there is any garbage bit. In this embodiment, the compressed bitstream segment $BS'_{BK\_}1$ has no garbage bit resulting from encoder-side dummy bit insertion. Hence, the compressed bitstream segment BS'$_{BK}$_1 is fully decoded to generate one data partition of a block. Similarly, the compressed bitstream segment BS'$_{BK}$_2 may be fully decoded or partially decoded, depending upon whether there is any garbage bit. In this embodiment, the compressed bitstream segment BS'$_{BK}$_2 has two garbage bits (e.g., last two bits labeled by "13" and "15") resulting from encoder-side dummy bit insertion. Hence, the compressed bitstream segment BS'$_{BK}$_2 is partially decoded to generate the other data partition of the block. More specifically, bits labeled by "1", "3", "5", "7", "9" and "11" are decoded, and bits labeled by "13" and "15" are discarded directly.

Figure 24:
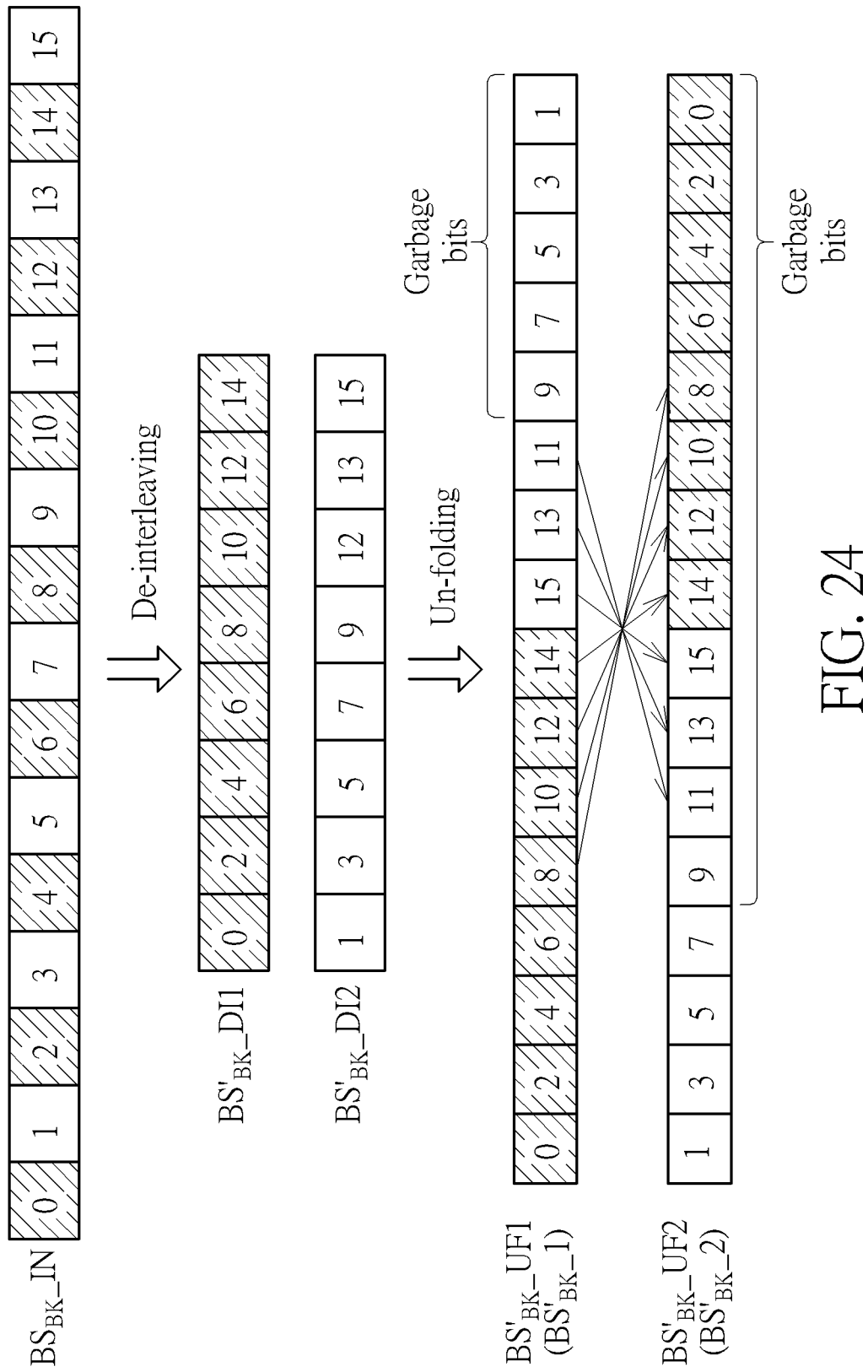
FIG. 24 is a diagram illustrating a second bitstream splitting operation according to an embodiment of the present invention.

FIG. 24 is a diagram illustrating a second bitstream splitting operation according to an embodiment of the present invention. Suppose that the encoding apparatus 100 generates the output bitstream BS$_{BK}$_OUT (which acts as the input bitstream BS$_{BK}$_IN of the decoding apparatus 2200) by applying a bit group based folding process to two compressed bitstream segments BS$_{BK}$_1 and BS$_{BK}$_2 and then applying a bit group based interleaving process to two folded bitstream segments generated by the bit group based folding process, where each bit group has only a single bit. Since the input bitstream BS$_{BK}$_IN is a folded and interleaved bitstream segment, the de-interleaving circuit 2210 first applies a bit group based de-interleaving process to the input bitstream BS$_{BK}$_IN. According to the bit group based de-interleaving process, the input bitstream BS$_{BK}$_IN is divided into a plurality of bit groups, and consecutive bit groups in the input bitstream BS$_{BK}$_IN are dispatched to different de-interleaved bitstream segments, respectively. Since each bit group has only a single bit, one de-interleaved bitstream segment BS'$_{BK}$_DI1 has bits labeled by "0", "2", "4", "6", "8", "10", "12", and "14", and the other de-interleaved bitstream segment BS'$_{BK}$_DI2 has bits labeled by "1", "3", "5", "7", "9", "11", "13", and "15".

Next, the un-folding circuit 2212 applied an un-folding process to the de-interleaved bitstream segments BS'$_{BK}$_DI1 and BS'$_{BK}$_DI2. According to the un-folding process, one un-folded bitstream segment BS$_{BK}$_UF1 is generated by duplicating bits of the de-interleaved bitstream segment BS'$_{BK}$_DI2 and appending the duplicated bits of the de-interleaved bitstream segment BS'$_{BK}$_DI2 to the de-interleaved bitstream segment BS'$_{BK}$_DI1 in a reverse bit order, and the other un-folded bitstream segment BS$_{BK}$_UF2 is generated by duplicating bits of the de-interleaved bitstream segment BS'$_{BK}$_DI1 and appending the duplicated bits of the de-interleaved bitstream segment BS'$_{BK}$_DI1 to the de-interleaved bitstream segment BS'$_{BK}$_DI2 in a reverse bit order. The un-folded bitstream segments BS$_{BK}$_UF1 and BS$_{BK}$_UF2 act as compressed bitstream segments BS'$_{BK}$_1 and BS'$_{BK}$_2 fed into the decoding circuit 2204.

An un-folded bitstream segment obtained from an un-folding process may be fully decoded or partially decoded, depending upon whether there is any dummy bit. For example, the un-folded bitstream segment BS'$_{BK}$_UF1 has garbage bits (e.g., bits labeled by "9", "7", "5", "3", and "1"), and the un-folded bitstream segment BS'$_{BK}$_DI2 has garbage bits (e.g., bits labeled by "9", "11", "13", "15", "14", "12", "10", "8", "6", "4", "2", and "0"). Regarding the un-folded bitstream segment BS'$_{BK}$_UF1, bits "7", "5", "3", and "1" may belong to a second data partition that is different from a first data partition to be obtained from decoding the un-folded bitstream segment BS'$_{BK}$_UF1, and the bit "9" may be created due to encoder-side dummy bit insertion. Regarding the un-folded bitstream segment BS'$_{BK}$_DI2, the bit "9" may be created due to encoder-side dummy bit insertion, and bits "11", "13", "15", "14", "12", "10", "8", "6", "4", "2", and "0" may belong to the first data partition that is different from the second data partition to be obtained from decoding the un-folded bitstream segment BS'$_{BK}$_DI2. However, this is for illustrative purposes only, and is not meant to be a limitation of the present invention. For another example, bits "9", "7", "5", "3", and "1" of the un-folded bitstream segment BS'$_{BK}$_UF1 may be garbage bits due to the fact that bits "9", "7", "5", "3", and "1" may belong to a second data partition that is different from a first data partition to be obtained from decoding the un-folded bitstream segment BS'$_{BK}$_UF1, and bits "11", "13", "15", "14", "12", "10", "8", "6", "4", "2", and "0" of the un-folded bitstream segment BS'$_{BK}$_DI2 may be garbage bits due to the face that bits "11", "13", "15", "14", "12", "10", "8", "6", "4", "2", and "0" may belong to the first data partition that is different from the second data partition to be obtained from decoding the un-folded bitstream segment BS'$_{BK}$_DI2.

Figure 25:
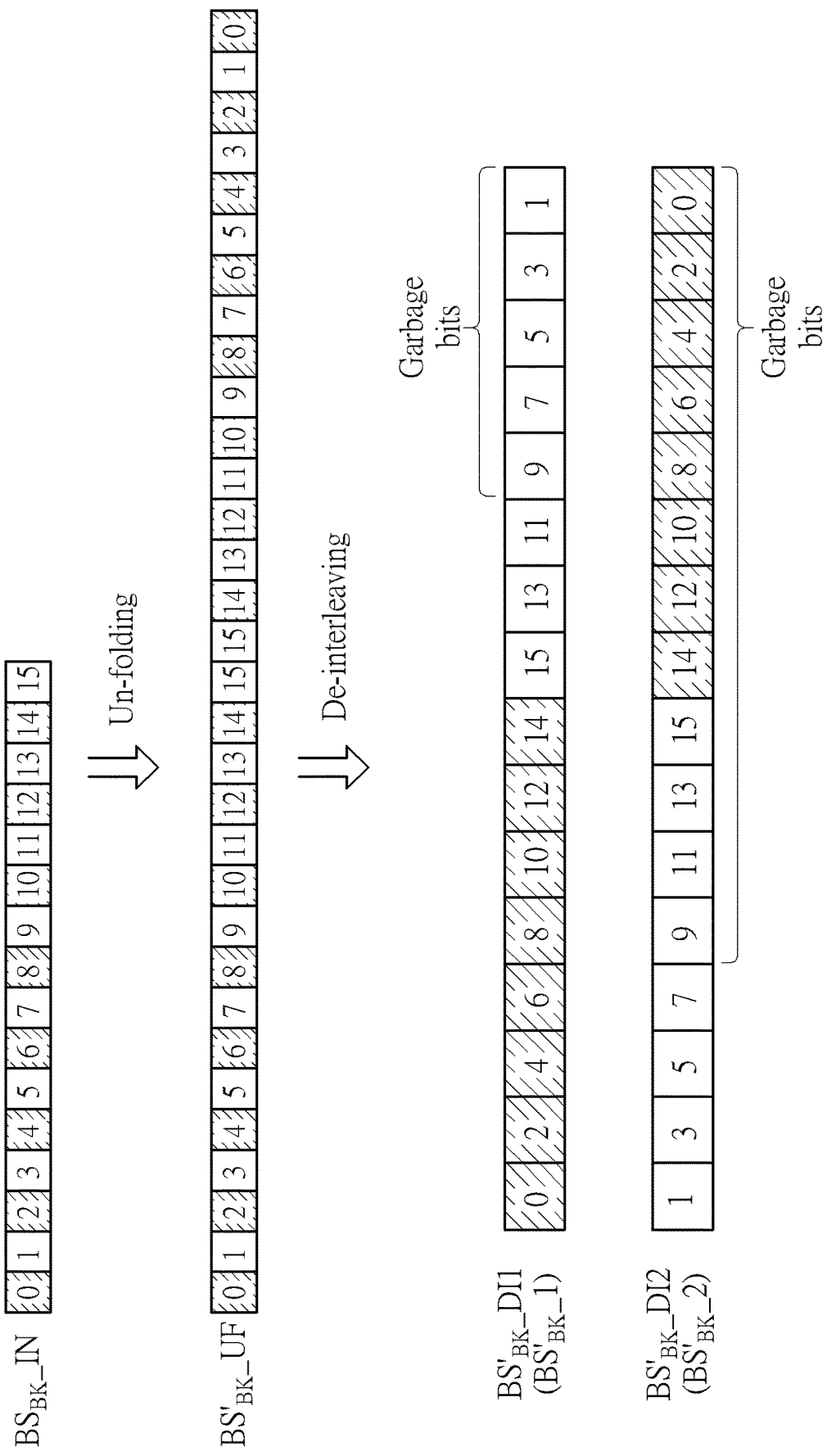
FIG. 25 is a diagram illustrating a third bitstream splitting operation according to an embodiment of the present invention.

FIG. 25 is a diagram illustrating a third bitstream splitting operation according to an embodiment of the present invention. Suppose that the encoding apparatus 100 generates the output bitstream BS$_{BK}$_OUT (which acts as the input bitstream BS$_{BK}$_IN of the decoding apparatus 2200) by applying a bit group based interleaving process to two compressed bitstream segments BS$_{BK}$_1 and BS$_{BK}$_2 and then applying a bit group based folding process to an interleaved bitstream segment generated by the bit group based interleaving process, where each bit group has only a single bit. Since the input bitstream BS$_{BK}$_IN is an interleaved and folded bitstream segment, the un-folding circuit 2212 first applies an un-folding process to the input bitstream BS$_{BK}$_IN. According to the un-folding process, an un-folded bitstream segment BS'$_{BK}$_UF is generated by duplicating bits of the input bitstream BS$_{BK}$_IN and appending the duplicated bits of the input bitstream BS$_{BK}$_IN to the input bitstream BS$_{BK}$_IN in a reverse bit order.

Next, the de-interleaving circuit 2210 applies a bit group based de-interleaving process to the un-folded bitstream segment BS'$_{BK}$_UF. According to the bit group based de-interleaving process, the un-folded bitstream segment BS'$_{BK}$_UF is divided into a plurality of bit groups, and consecutive bit groups in the un-folded bitstream segment BS'$_{BK}$_UF are dispatched to different de-interleaved bitstream segments, respectively. Since each bit group has only a single bit, one de-interleaved bitstream segment BS'$_{BK}$_DI1 has bits labeled by "0", "2", "4", "6", "8", "10", "12", "14", "15", "13", "11", "9", "7", "5", "3", and "1", and the other de-interleaved bitstream segment BS'$_{BK}$_DI2 has bits labeled by "1", "3", "5", "7", "9", "11", "13", "15", "14", "12", "10", "8", "6", "4", "2", and "0". The de-interleaved bitstream segments BS$_{BK}$_DI1 and BS$_{BK}$_DI2 act as compressed bitstream segments BS'$_{BK}$_1 and BS'$_{BK}$_2 fed into the decoding circuit 2204.

A de-interleaved bitstream segment obtained from a bit group based de-interleaving process may be fully decoded or partially decoded, depending upon whether there is any dummy bit. For example, the de-interleaved bitstream segment BS'$_{BK}$_DI1 has garbage bits (e.g., bits labeled by "9", "7", "5", "3", and "1"), and the de-interleaved bitstream segment BS'$_{BK}$_DI2 has garbage bits (e.g., bits labeled by "9", "11", "13", "15", "14", "12", "10", "8", "6", "4", "2", and "0"). Regarding the de-interleaved bitstream segment BS'$_{BK}$_DI1, bits "7", "5", "3", and "1" may belong to a second data partition that is different from a first data partition to be obtained from decoding the de-interleaved bitstream segment BS'$_{BK}$_DI1, and the bit "9" may be created due to encoder-side dummy bit insertion. Regarding the de-interleaved bitstream segment BS'$_{BK\_}$DI2, the bit "9" may be created due to encoder-side dummy bit insertion, and bits "11", "13", "15", "14", "12", "10", "8", "6", "4", "2", and "0" may belong to the first data partition that is different from the second data partition to be obtained from decoding the de-interleaved bitstream segment BS'$_{BK\_}$DI2. However, this is for illustrative purposes only, and is not meant to be a limitation of the present invention. For another example, bits "9", "7", "5", "3", and "1" of the de-interleaved bitstream segment BS'$_{BK\_}$DI1 may be garbage bits due to the fact that bits "9", "7", "5", "3", and "1" may belong to a second data partition that is different from a first data partition to be obtained from decoding the de-interleaved bitstream segment BS'$_{BK\_}$DI1, and bits "11", "13", "15", "14", "12", "10", "8", "6", "4", "2", and "0" of the de-interleaved bitstream segment BS'$_{BK\_}$DI2 may be garbage bits due to the face that bits "11", "13", "15", "14", "12", "10", "8", "6", "4", "2", and "0" may belong to the first data partition that is different from the second data partition to be obtained from decoding the de-interleaved bitstream segment BS'$_{BK\_}$DI2.

Figure 26:
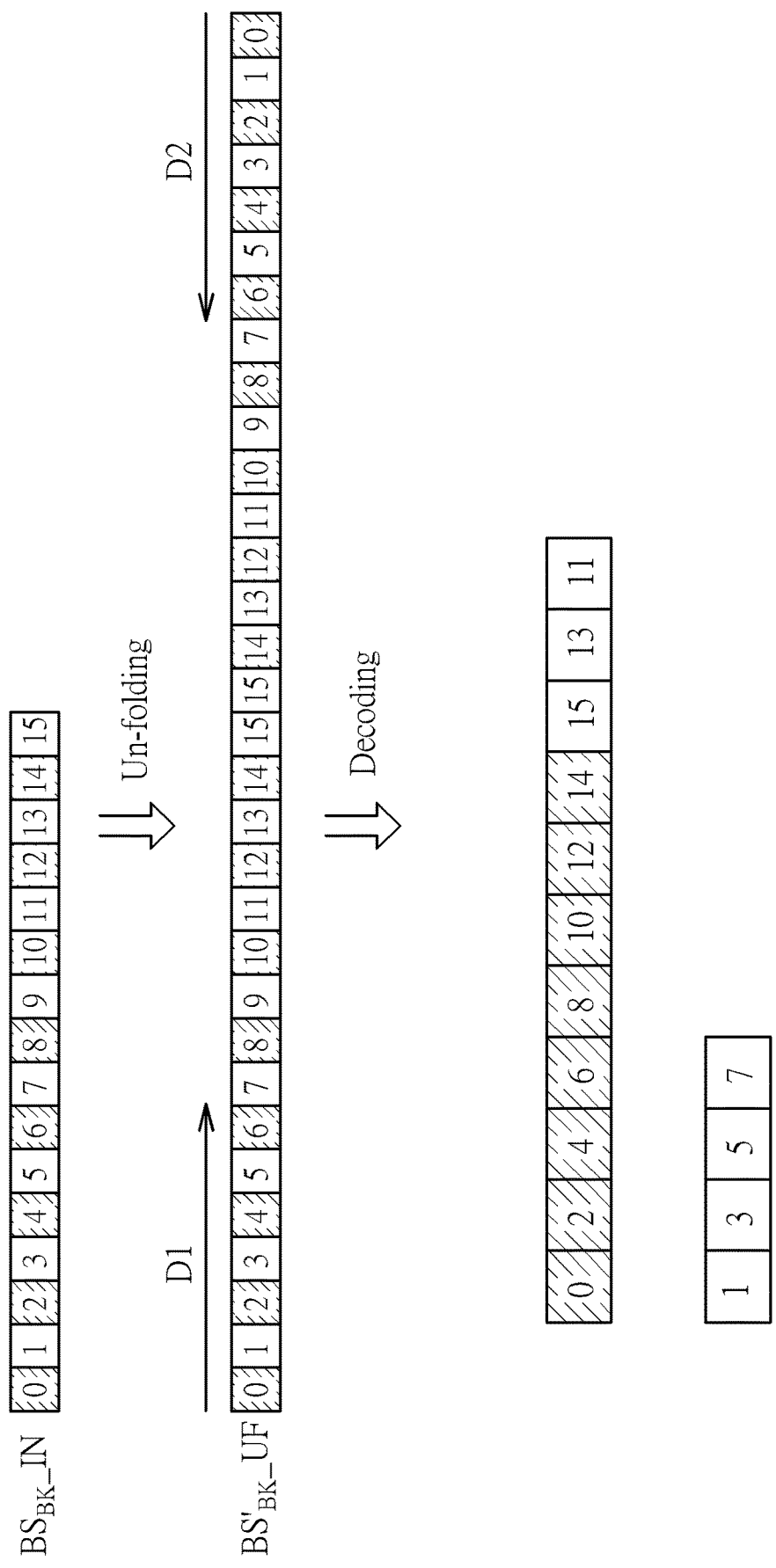
FIG. 26 is a diagram illustrating a decoding operation without a de-interleaving process according to an embodiment of the present invention.

Alternatively, the de-interleaving process shown in FIG. 25 may be omitted. FIG. 26 is a diagram illustrating a decoding operation without a de-interleaving process according to an embodiment of the present invention. The un-folding circuit 2212 generates the un-folded bitstream segment BS'$_{BK\_}$UF by duplicating bits of the input bitstream BS$_{BK\_}$IN and appending the duplicated bits of the input bitstream BS$_{BK\_}$IN to the input bitstream BS$_{BK\_}$IN in a reverse bit order, and outputs the un-folded bitstream segment BS'$_{BK\_}$UF to the decoding circuit 2204. In this embodiment, the decoding circuit 2204 is arranged to decode the un-folded bitstream segment BS'$_{BK\_}$UF in opposite directions D1 and D2 for obtaining a plurality of data partitions of block data of the block, respectively. For example, the decoding circuit 2204 may employ a parallel decoding scheme which decodes first bits (e.g., even bits "0", "2", "4", "6", "8", "10", "12", "14", "15", "13", and "11") of the un-folded bitstream segment BS'$_{BK\_}$UF in a forward bit order complying with the direction D1 to obtain a first data partition of block data of the block, and further decodes second bits (e.g., odd bits "1", "3", "5", and "7") of the un-folded bitstream segment BS'$_{BK\_}$UF in a reverse bit order complying with the direction D2 to obtain a second data partition of block data of the block.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoding method for encoding an image, the image comprising a plurality of blocks each having a plurality of pixels, the encoding method comprising:

encoding a plurality of data partitions of block data of a block in the image to generate a plurality of compressed bitstream segments, respectively; and combining, by a combining circuit, the compressed bitstream segments to generate an output bitstream of the block, comprising:

performing a bit group based interleaving process, wherein according to the bit group based interleaving process, each of the compressed bitstream segments is divided into a plurality of bit groups each having at least one bit, and the output bitstream comprises consecutive bit groups belonging to different compressed bitstream segments, respectively;

wherein the different compressed bitstream segments comprise one compressed bitstream segment with one bitstream length and another compressed bitstream segment with another bitstream length shorter than said one bitstream length, and the output bitstream further comprises consecutive bit groups belonging to said one compressed bitstream segment and one dummy bit group, respectively, where said one dummy bit group inserted by the bit group based interleaving process has at least one dummy bit.

2. The encoding method of claim 1, wherein the data partitions comprise a first data partition and a second data partition, the first data partition comprises a complete pixel data of a first pixel, the second data partition comprises a complete pixel data of a second pixel, and the first pixel and the second pixel are different pixels included in the block.

3. The encoding method of claim 1, wherein the data partitions comprise a first data partition and a second data partition, the first data partition comprises a sub-pixel data of a first sub-pixel included in a pixel of the block, the second data partition comprises a sub-pixel data of a second sub-pixel included in the pixel of the block, and the first sub-pixel and the second sub-pixel correspond to different color channels.

4. The encoding method of claim 1, wherein the output bitstream further comprises a leading bitstream segment that is inserted without undergoing the bit group based interleaving process.

5. The encoding method of claim 1, wherein the compressed bitstream segments comprise a first compressed bitstream segment group and a second compressed bitstream segment group, the first compressed bitstream segment group has multiple compressed bitstream segments, the second compressed bitstream segment group has only a single compressed bitstream segment; and combining the compressed bitstream segments to generate the output bitstream of the block comprises:

generating a first interleaved bitstream segment by applying the bit group based interleaving process to the first compressed bitstream segment group; and generating a second interleaved bitstream segment by applying the bit group based interleaving process to at least the first interleaved bitstream segment and the second compressed bitstream segment group, wherein the output bitstream is derived from at least the second interleaved bitstream segment.

6. The encoding method of claim 1, wherein the compressed bitstream segments comprise a first compressed bitstream segment group and a second compressed bitstream segment group, each of the first compressed bitstream segment group and the second compressed bitstream segment group has multiple compressed bitstream segments; and combining the compressed bitstream segments to generate the output bitstream of the block comprises:

generating a first interleaved bitstream segment by applying the bit group based interleaving process to the first compressed bitstream segment group;

generating a second interleaved bitstream segment by applying the bit group based interleaving process to the second interleaved bitstream segment; and generating a third interleaved bitstream segment by applying the bit group based interleaving process to at least the first interleaved bitstream segment and the second interleaved bitstream segment, wherein the output bitstream is derived from at least the third interleaved bitstream segment.

7. The encoding method of claim 1, wherein the compressed bitstream segments comprise a first compressed bitstream segment with a first bitstream length and a second compressed bitstream segment with a second bitstream length shorter than the first bitstream length; the bit group based interleaving process applied to the first compressed bitstream segment and the second compressed bitstream segment generates an interleaved bitstream segment with at least one dummy bit group, where each of said at least one dummy bit group inserted by the bit group based interleaving process has at least one dummy bit; and combining the compressed bitstream segments to generate the compressed bitstream of the block further comprises:

performing a bit group based folding process, wherein according to the bit group based folding process, a folded bitstream segment is generated by folding the interleaved bitstream segment at a folding point between a first bitstream segment and a second bitstream segment following the first bitstream segment, where each dummy bit group included in the second bitstream segment of the interleaved bitstream segment is discarded, at least one bit group of the second bitstream segment is moved to the first bitstream segment of the interleaved bitstream segment for replacing at least one dummy bit group included in the first bitstream segment with said at least one bit group of the second bitstream segment, and the output bitstream is derived from at least the folded bitstream segment.

8. The encoding method of claim 7, wherein the first bitstream segment comprises a first dummy bit group and a second dummy bit group, where the first dummy bit group is closer to the folding point than the second dummy bit group;

the second bitstream segment comprises a first bit group and a second bit group, where the first bit group is closer to the folding point than the second bit group; and the bit group based folding process applied to the interleaved bitstream segment replaces the first dummy bit group with the first bit group and replaces the second dummy bit group with the second bit group.

9. The encoding method of claim 7, wherein the compressed bitstream segments comprise a first compressed bitstream segment group and a second compressed bitstream segment group, the first compressed bitstream segment group has multiple compressed bitstream segments, the second compressed bitstream segment group has only a single compressed bitstream segment; and combining the compressed bitstream segments to generate the output bitstream of the block comprises:

generating a first interleaved bitstream segment by applying the bit group based interleaving process to the first compressed bitstream segment group;

generating a first folded bitstream segment by applying the bit group based folding process to the first interleaved bitstream segment;

generating a second interleaved bitstream segment by applying the bit group based interleaving process to at least the second compressed bitstream segment group and the first folded bitstream segment; and generating a second folded bitstream segment by applying the bit group based folding process to the second interleaved bitstream segment, wherein the output bitstream is derived from at least the second folded bitstream segment.

10. The encoding method of claim 7, wherein the compressed bitstream segments comprise a first compressed bitstream segment group and a second compressed bitstream segment group, each of the first compressed bitstream segment group and the second compressed bitstream segment group has multiple compressed bitstream segments; and combining the compressed bitstream segments to generate the output bitstream of the block comprises:

generating a first interleaved bitstream segment by applying the bit group based interleaving process to the first compressed bitstream segment group;

generating a first folded bitstream segment by applying the bit group based folding process to the first interleaved bitstream segment;

generating a second interleaved bitstream segment by applying the bit group based interleaving process to the second compressed bitstream segment group;

generating a second folded bitstream segment by applying the bit group based folding process to the second interleaved bitstream segment; and generating a third interleaved bitstream segment by applying the bit group based interleaving process to at least the first folded bitstream segment and the second folded bitstream segment; and generating a third folded bitstream segment by applying the bit group based folding process to the third interleaved bitstream segment, wherein the output bitstream is derived from at least the third folded bitstream segment.

11. The encoding method of claim 1, wherein the compressed bitstream segments comprise a first compressed bitstream segment with a first bitstream length and a second compressed bitstream segment with a second bitstream length shorter than the first bitstream length; and combining the compressed bitstream segments to generate the compressed bitstream of the block further comprises:

performing a bit group based folding process, wherein according to the bit group based folding process, the first compressed bitstream segment is folded at a folding point between a first bitstream segment and a second bitstream segment following the first bitstream segment, one folded bitstream segment is generated by removing the second bitstream segment from the first bitstream segment, and another folded bitstream segment is generated by adding the second bitstream segment to the second compressed bitstream segment;

wherein the bit group based interleaving process is applied to said one folded bitstream segment and said another folded bitstream segment to generate an interleaved bitstream segment, and the output bitstream is derived from at least the interleaved bitstream segment.

12. The encoding method of claim 11, wherein the second bitstream segment comprises a first bit group and a second bit group, where the first bit group is closer to the folding point than the second bit group; and the first bit group included in said another second folded bitstream segment is closer to an end point of said another folded bitstream segment than the second bit group included in said another folded bitstream segment.

13. The encoding method of claim 11, wherein the compressed bitstream segments comprise a first compressed bitstream segment group and a second compressed bitstream segment group, the first compressed bitstream segment group has multiple compressed bitstream segments, the second compressed bitstream segment group has only a single compressed bitstream segment; and combining the compressed bitstream segments to generate the output bitstream of the block comprises:
   generating a first folded bitstream segment group by applying the bit group based folding process to the first compressed bitstream segment group, wherein the first folded bitstream segment group has multiple folded bitstream segments;
   generating a first interleaved bitstream segment by applying the bit group based interleaving process to the first folded bitstream segment group;
   generating a second folded bitstream segment group by applying the bit group based folding process to at least the second compressed bitstream segment group and the first interleaved bitstream segment, wherein the second folded bitstream segment group has multiple folded bitstream segments; and
   generating a second interleaved bitstream segment by applying the bit group based interleaving process to the second folded bitstream segment group, wherein the output bitstream is derived from at least the second interleaved bitstream segment.

14. The encoding method of claim 11, wherein the compressed bitstream segments comprise a first compressed bitstream segment group and a second compressed bitstream segment group, each of the first compressed bitstream segment group and the second compressed bitstream segment group has multiple compressed bitstream segments; and combining the compressed bitstream segments to generate the output bitstream of the block comprises:
   generating a first folded bitstream segment group by applying the bit group based folding process to the first compressed bitstream segment group, wherein the first folded bitstream segment group has multiple folded bitstream segments;
   generating a first interleaved bitstream segment by applying the bit group based interleaving process to the first folded bitstream segment group;
   generating a second folded bitstream segment group by applying the bit group based folding process to the second compressed bitstream segment group, wherein the second folded bitstream segment group has multiple folded bitstream segments;
   generating a second interleaved bitstream segment by applying the bit group based interleaving process to the second folded bitstream segment group;
   generating a third folded bitstream segment group by applying the bit group based folding process to at least the first interleaved bitstream segment and the second interleaved bitstream segment, wherein the second folded bitstream segment group has multiple folded bitstream segments; and
   generating a third interleaved bitstream segment by applying the bit group based interleaving process to the third folded bitstream segment group, wherein the output bitstream is derived from at least the third interleaved bitstream segment.

15. A decoding method for decoding an input bitstream of a block in an image, the image comprising a plurality of blocks each having a plurality of pixels, the decoding method comprising:
   deriving, by a splitting circuit, a plurality of compressed bitstream segments from the input bitstream, comprising:
      performing a bit group based de-interleaving process, wherein according to the bit group based de-interleaving process, the input bitstream is divided into a plurality of bit groups each having at least one bit, and consecutive bit groups in the input bitstream are dispatched to different compressed bitstream segments, respectively; and
   decoding the compressed bitstream segments to obtain a plurality of data partitions of block data of the block, respectively;
   wherein the bit group based de-interleaving process is applied to a folded and interleaved bitstream segment of the input bitstream for generating a plurality of de-interleaved bitstream segments, where the de-interleaved bitstream segments comprise a first de-interleaved bitstream segment and a second de-interleaved bitstream segment; and deriving the compressed bitstream segments from the input bitstream further comprises:
   performing an un-folding process, wherein according to the un-folding process, one un-folded bitstream segment is generated by duplicating bits of the second de-interleaved bitstream segment and appending the duplicated bits of the second de-interleaved bitstream segment to the first de-interleaved bitstream segment in a reverse bit order.

16. A decoding method for decoding an input bitstream of a block in an image, the image comprising a plurality of blocks each having a plurality of pixels, the decoding method comprising:
   deriving, by a splitting circuit, a plurality of compressed bitstream segments from the input bitstream, comprising:
      performing a bit group based de-interleaving process, wherein according to the bit group based de-interleaving process, the input bitstream is divided into a plurality of bit groups each having at least one bit, and consecutive bit groups in the input bitstream are dispatched to different compressed bitstream segments, respectively; and
   decoding the compressed bitstream segments to obtain a plurality of data partitions of block data of the block, respectively;
   wherein deriving the compressed bitstream segments from the input bitstream further comprises:
   performing an un-folding process, wherein according to the un-folding process, an un-folded bitstream segment is generated by duplicating bits of a folded and interleaved bitstream segment of the input bitstream and appending the duplicated bits of the folded and interleaved bitstream segment to the folded and interleaved bitstream segment in a reverse bit order;
   wherein the bit group based de-interleaving process is applied to the un-folded bitstream segment for generating a plurality of de-interleaved bitstream segments.

* * * * *